US012664794B2

(12) United States Patent
Kinoshita et al.

(10) Patent No.: US 12,664,794 B2
(45) Date of Patent: Jun. 23, 2026

(54) VEHICLE CONTROL METHOD, VEHICLE CONTROL SYSTEM, AND NON-TRANSITORY STORAGE MEDIUM

(71) Applicants: TOYOTA JIDOSHA KABUSHIKI KAISHA, Toyota (JP); DENSO CORPORATION, Kariya-city (JP)

(72) Inventors: Mitsuhiro Kinoshita, Mishima (JP); Akihiro Watanabe, Tokyo (JP); Hiroaki Shimizu, Susono (JP); Ichiro Matsuyama, Kawasaki (JP); Masaki Kishimoto, Tokyo (JP); Masamichi Ohsugi, Shizuoka-ken (JP); Masateru Udate, Tokyo (JP); Satoshi Takeyasu, Saitama (JP); Takahiro Doi, Tokyo (JP); Takashi Morimoto, Tokyo (JP)

(73) Assignees: TOYOTA JIDOSHA KABUSHIKI KAISHA, Toyota (JP); DENSO CORPORATION, Kariya-city (JP)

( * ) Notice: Subject to any disclaimer, the term of this patent is extended or adjusted under 35 U.S.C. 154(b) by 575 days.

(21) Appl. No.: 18/122,816

(22) Filed: Mar. 17, 2023

(65) Prior Publication Data

US 2023/0306753 A1 Sep. 28, 2023

(30) Foreign Application Priority Data

Mar. 22, 2022 (JP) ................................. 2022-046046

(51) Int. Cl.
| | |
|---|---|
| *G06V 20/58* | (2022.01) |
| *B60Q 1/14* | (2006.01) |
| *G06V 10/141* | (2022.01) |
| *G06V 10/56* | (2022.01) |

(52) U.S. Cl.
CPC ........... *G06V 20/584* (2022.01); *B60Q 1/143* (2013.01); *G06V 10/141* (2022.01); *G06V 10/56* (2022.01);
(Continued)

(58) Field of Classification Search
CPC .... G06V 20/584; G06V 10/141; G06V 10/56; B60Q 1/143; B60Q 2300/054;
(Continued)

(56) References Cited

U.S. PATENT DOCUMENTS

| | | | |
|---|---|---|---|
| 2013/0175926 A1* | 7/2013 | Katsuno | ................. B60Q 1/143 315/82 |
| 2013/0253754 A1* | 9/2013 | Ferguson | ............. G05D 1/0246 701/28 |

(Continued)

FOREIGN PATENT DOCUMENTS

| | | |
|---|---|---|
| CN | 113015653 A | 6/2021 |
| DE | 10060734 A1 | 6/2002 |

(Continued)

*Primary Examiner* — John B Strege
(74) *Attorney, Agent, or Firm* — Dinsmore & Shohl LLP

(57) ABSTRACT

A method includes: recognizing a signal candidate position around a vehicle by using a sensor mounted on the vehicle, the signal candidate position being a position a traffic light is possibly present, the vehicle including a light configured in such a manner that a light distribution state of the light changes; and performing a first light control process of controlling the light in response to recognition of the signal candidate position, the first light control process including at least one of: increasing an intensity of light emitted to the signal candidate position to a value higher than before the recognition of the signal candidate position; or making the intensity of the light emitted to the signal candidate position higher than an intensity of light emitted to an area other than the signal candidate position.

12 Claims, 18 Drawing Sheets

(52) U.S. Cl.
      CPC .. *B60Q 2300/054* (2013.01); *B60Q 2300/314*
                  (2013.01); *B60Q 2300/332* (2013.01)
(58) Field of Classification Search
      CPC ........ B60Q 2300/314; B60Q 2300/332; B60Q
                  2300/45; B60Q 1/249; B60Q 1/085;
                  B60Q 1/08; B60W 30/0956; B60W
                  40/04; B60W 60/001; B60W 60/0015;
                  B60W 2420/403; B60W 2555/60
      See application file for complete search history.

(56)                   References Cited

U.S. PATENT DOCUMENTS

| | | |
|---|---|---|
| 2020/0001775 A1 | 1/2020 | Lee |
| 2020/0401824 A1 | 12/2020 | Hayashi et al. |
| 2021/0027076 A1* | 1/2021 | Hayashi ............... G06V 20/584 |
| 2021/0046862 A1 | 2/2021 | Wang |
| 2021/0402915 A1 | 12/2021 | Watano et al. |

FOREIGN PATENT DOCUMENTS

| | | | |
|---|---|---|---|
| DE | 102016009507 A1 | 2/2018 | |
| DE | 102018109766 A1 | 10/2019 | |
| EP | 3403879 A1 | 11/2018 | |
| EP | 3770880 A1 | 1/2021 | |
| JP | 2020-199994 A | 12/2020 | |
| JP | 2021-002275 A | 1/2021 | |
| JP | 2021-018737 A | 2/2021 | |
| WO | WO-2010097211 A1 * | 9/2010 | ............ G08G 1/097 |
| WO | WO-2013051349 A1 * | 4/2013 | ............ B60Q 1/143 |

* cited by examiner

Figure 13:
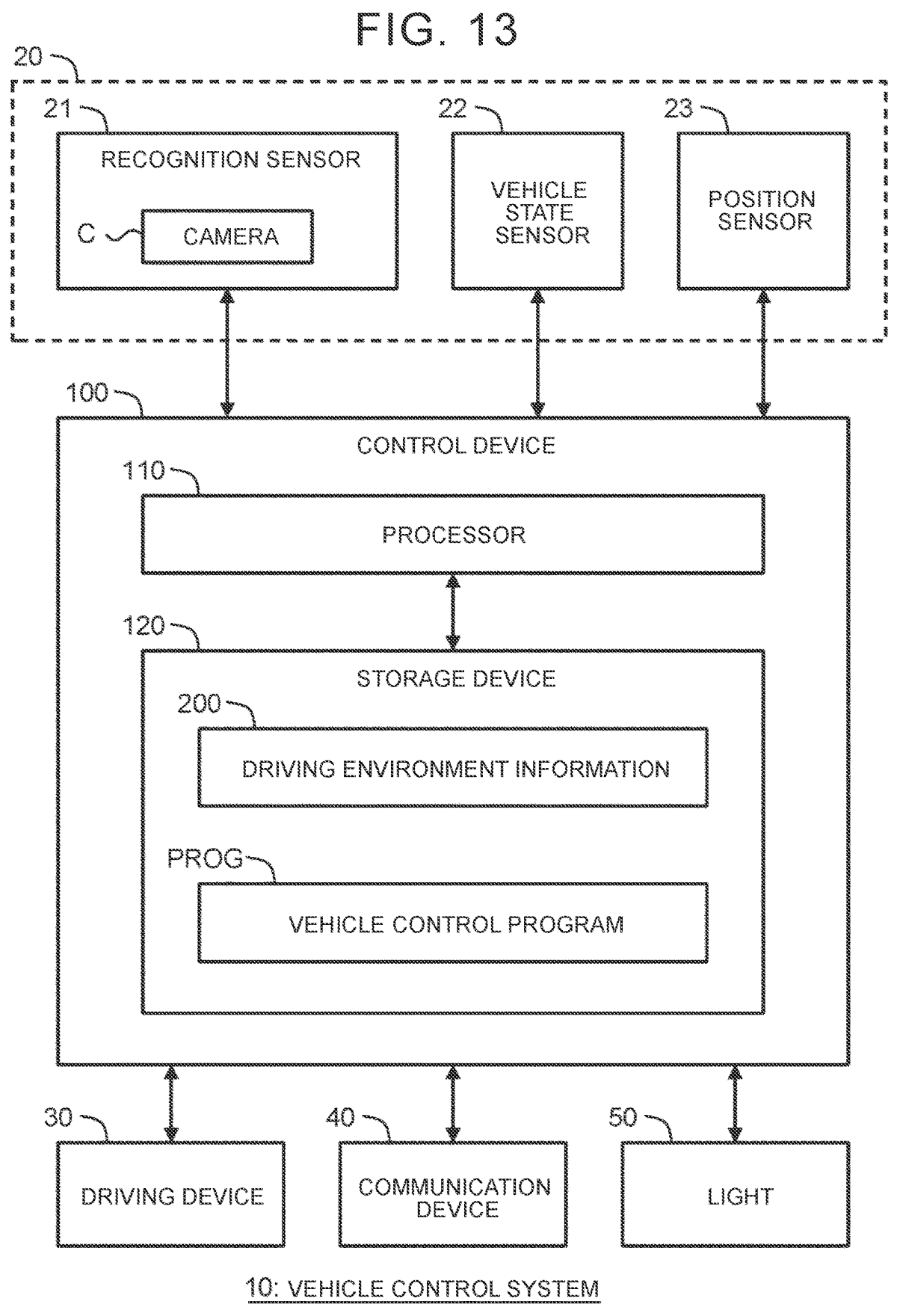

21 RECOGNITION SENSOR

C — CAMERA

22 VEHICLE STATE SENSOR

23 POSITION SENSOR

100 CONTROL DEVICE

110 PROCESSOR

120 STORAGE DEVICE

200 DRIVING ENVIRONMENT INFORMATION

PROG VEHICLE CONTROL PROGRAM

30 DRIVING DEVICE

40 COMMUNICATION DEVICE

50 LIGHT

10: VEHICLE CONTROL SYSTEM

INTERSECTION

VEHICLE CONTROL METHOD, VEHICLE CONTROL SYSTEM, AND NON-TRANSITORY STORAGE MEDIUM

CROSS-REFERENCE TO RELATED APPLICATION

This application claims priority to Japanese Patent Application No. 2022-046046 filed on Mar. 22, 2022 incorporated herein by reference in its entirety.

BACKGROUND

1. Technical Field

The present disclosure relates to a vehicle control method, a vehicle control system, and a non-transitory storage medium.

2. Description of Related Art

Japanese Unexamined Patent Application Publication No. 2021-002275 (JP 2021-002275 A) discloses a signal recognition system. The signal recognition system detects a target traffic light around the vehicle based on an image captured by an in-vehicle camera, and acquires signal detection information. The signal detection information indicates at least the appearance of each of a plurality of detected portions of the target traffic light. Light pattern information indicates the relative positional relationship between or among a plurality of light portions of a traffic light and the appearance of each of the light portions when each light portion is on. The signal recognition system recognizes the lighting state of the target traffic light by comparing the signal detection information and the light pattern information.

SUMMARY

A situation in which a vehicle recognizes a traffic light using an in-vehicle camera will be considered. There is a possibility that the accuracy of traffic light recognition may decrease in a dark environment such as at night or in the evening.

For example, there are not only the light of signal indications but also various kinds of light at night. Even if red, yellow, or green light is recognized, it is not always the light of a signal indication. In order to determine whether the recognized light is the light of a signal indication, it is necessary to recognize whether there is a traffic light at the position of the light. One possible way to recognize the presence of a traffic light is to recognize a traffic light housing. However, objects that are not emitting light are hard to see at night, and traffic light housings are also hard to see at night. Accordingly, the probability of correctly recognizing the presence of a traffic light decreases. That is, the accuracy of traffic light recognition decreases at night.

The present disclosure provides a technique capable of improving the accuracy of traffic light recognition in a dark environment.

A first aspect relates to a vehicle control method includes: recognizing a signal candidate position around a vehicle by using a sensor mounted on the vehicle, the signal candidate position being a position a traffic light is possibly present, the vehicle including a light configured in such a manner that a light distribution state of the light changes; and performing a first light control process of controlling the light in response to recognition of the signal candidate position, the first light control process including at least one of: increasing an intensity of light emitted to the signal candidate position to a value higher than before the recognition of the signal candidate position; or making the intensity of the light emitted to the signal candidate position higher than an intensity of light emitted to an area other than the signal candidate position.

A second aspect relates to a vehicle control system includes: one or more processors configured to perform, a process of recognizing a signal candidate position around a vehicle by using a sensor mounted on the vehicle, the signal candidate position being a position at which a traffic light is possibly present, the vehicle including a light configured in such a manner that a light distribution state of the light changes; and a first light control process of controlling the light in response to recognition of the signal candidate position, the first light control process including at least one of: increasing an intensity of light emitted to the signal candidate position to a value higher than before the recognition of the signal candidate position; or making the intensity of the light emitted to the signal candidate position higher than an intensity of light emitted to an area other than the signal candidate position.

A third aspect relates to a non-transitory storage medium storing instructions that are executable by one or more processors and that cause the one or more processors to perform functions comprising: recognizing a signal candidate position around a vehicle by using a sensor mounted on the vehicle, the signal candidate position being a position at which a traffic light is possibly present, the vehicle including a light configured in such a manner that a light distribution state of the light changes; and performing a first light control process of controlling the light in response to recognition of the signal candidate position, the first light control process including at least one of: increasing an intensity of light emitted to the signal candidate position to a value higher than before the recognition of the signal candidate position; or making the intensity of the light emitted to the signal candidate position higher than an intensity of light emitted to an area other than the signal candidate position.

According to the present disclosure, a signal candidate position around the vehicle where there is a possibility that a traffic light is present is recognized. The first light control process is performed in response to the recognition of the signal candidate position. The first light control process includes either or both of: increasing the intensity of the light emitted to the signal candidate position to a value higher than before the recognition of the signal candidate position; and making the intensity of the light emitted to the signal candidate position higher than the intensity of the light emitted to the area other than the signal candidate position. The first light control process makes the signal candidate position more visible even in a dark environment, and increases the probability of recognizing a traffic light in a dark environment. That is, the accuracy of traffic light recognition is improved.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 6 is a conceptual diagram illustrating an example of a light control process according to the embodiment;

FIG. 8 is a conceptual diagram illustrating still another example of the light control process according to the embodiment;

FIG. 13 is a block diagram showing an example of the configuration of the vehicle control system according to the embodiment;

DETAILED DESCRIPTION OF EMBODIMENTS

An embodiment of the present disclosure will be described with reference to the accompanying drawings.

1. Overview of Vehicle Control System

Figure 1:
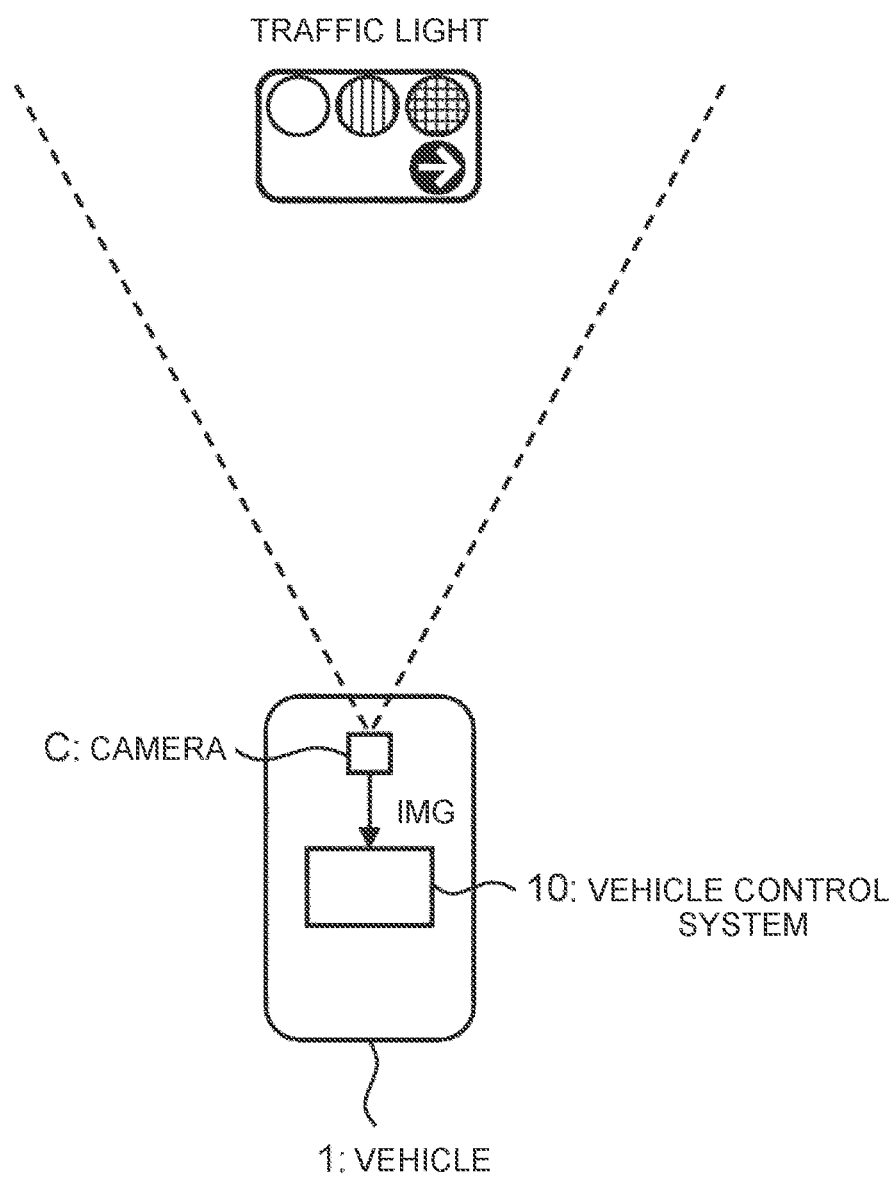
FIG. 1 is a conceptual diagram illustrating an overview of a vehicle control system applied to a vehicle according to an embodiment.

FIG. 1 is a conceptual diagram illustrating an overview of a vehicle control system 10 applied to a vehicle 1 according to the present embodiment. The vehicle control system 10 controls the vehicle 1. The vehicle control system 10 is typically mounted on the vehicle 1. Alternatively, at least a part of the vehicle control system 10 may be included in a remote system external to the vehicle 1 to remotely control the vehicle 1. That is, the vehicle control system 10 may be dispersedly located in the vehicle 1 and the remote system.

The vehicle 1 may be an autonomous driving vehicle. In that case, the vehicle control system 10 performs autonomous driving control of the vehicle 1. For example, the autonomous driving level is assumed to be such a level that the driver does not necessarily have to focus 100% on driving. The vehicle 1 may be a driverless autonomous driving vehicle.

A situation in which the vehicle control system 10 recognizes a traffic light around the vehicle 1 will be considered. For example, the vehicle control system 10 recognizes a traffic light ahead of the vehicle 1 and its signal indication (red, green, yellow, arrow, etc.), and performs autonomous driving control based on the recognition result. As another example, the vehicle control system 10 may notify the driver of the recognition result of the traffic light or signal indication ahead of the vehicle 1 to assist the driver in driving. As still another example, the vehicle control system 10 may send the recognition result of the traffic light or signal indication to an external management device (e.g., map management device). In any case, it is desired to accurately recognize a traffic light.

The vehicle control system 10 recognizes a traffic light around the vehicle 1 by using a camera C mounted on the vehicle 1. More specifically, the camera C acquires an image IMG showing the surroundings of the vehicle 1. The vehicle control system 10 recognizes a traffic light around the vehicle 1 based on the image IMG obtained by the camera C. For example, the vehicle control system 10 recognizes a traffic light in the image IMG by using image recognition artificial intelligence (AI) obtained by machine learning.

Figure 2:
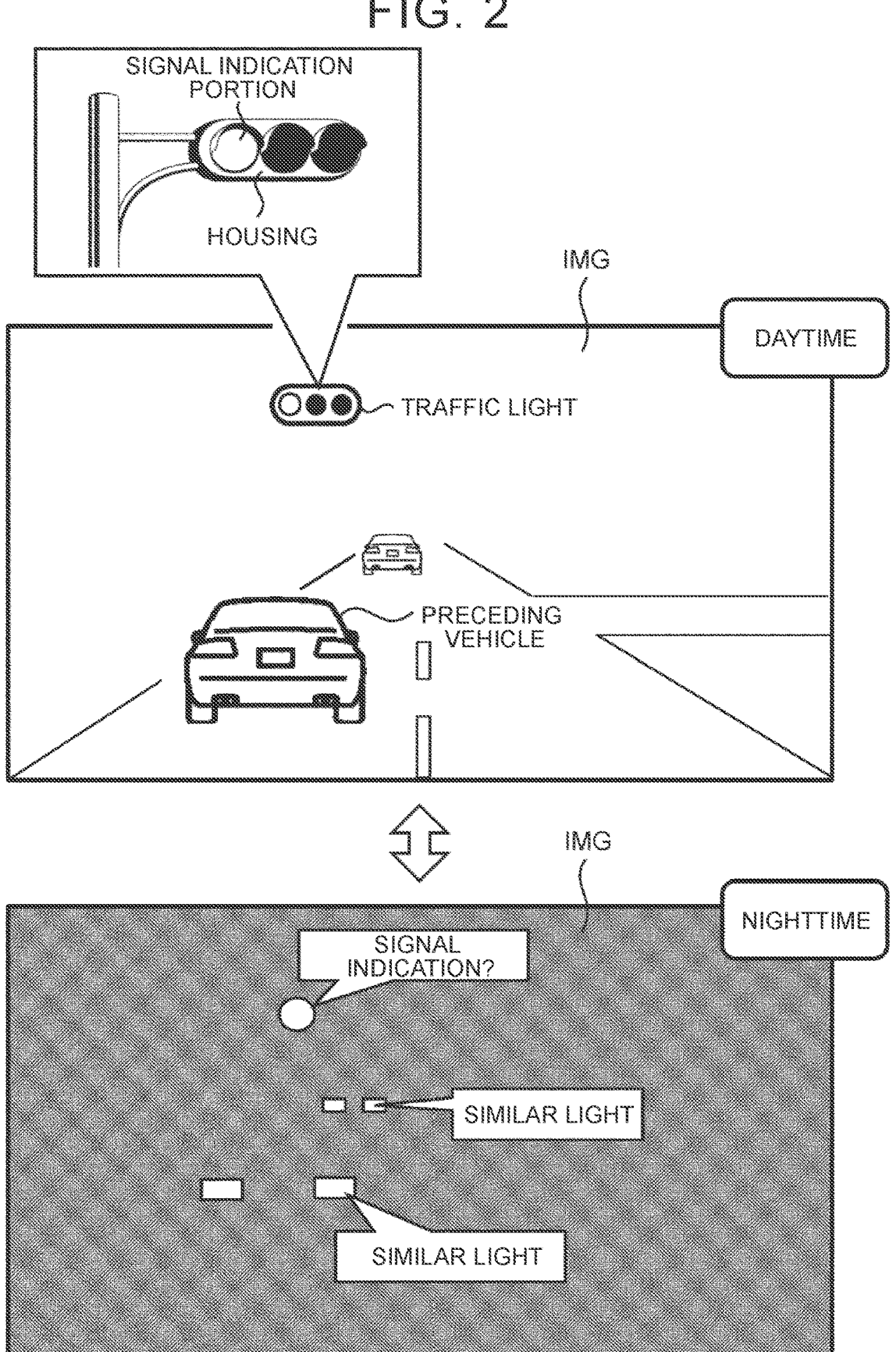
FIG. 2 is a conceptual diagram illustrating a problem.

However, there is a possibility that the accuracy of the traffic light recognition based on the image IMG may decrease in a dark environment such as at night or in the evening. FIG. 2 is a conceptual diagram illustrating this problem.

For example, there are not only the light of signal indications but also various kinds of light at night. Even if red, yellow, or green light is recognized, it is not always the light of a signal indication. For example, there is red light from taillights of a preceding vehicle. Another example is yellow light from a blinker of a preceding vehicle. Yet another example is green or yellow light from a rooflight (top light) of a taxi. In a situation where there is light similar to the light of a signal indication as described above, it is not desirable to determine that the recognized light is the light of a signal indication based only on the light recognition result. For example, during autonomous driving control, it may turn out that there is actually no red signal after the vehicle control system 10 determined that red light was a red traffic signal and automatically slowed down the vehicle 1. This means a decrease in accuracy of autonomous driving control.

In order to determine whether the recognized light is the light of a signal indication, it is necessary to recognize whether there is a traffic light at the position of the light. One possible way to recognize the presence of a traffic light is to recognize a traffic light housing. Traffic light housings are relatively easy to recognize during the day. However, objects that are not emitting light are hard to see at night, and traffic light housings are also hard to see at night. Accordingly, the probability of correctly recognizing (detecting) the presence of a traffic light decreases. That is, the accuracy of traffic light recognition decreases at night.

As another example, an arrow signal that accompanies a main signal will be considered. There are cases where a main signal indication is "red (prohibit from proceeding)" but an arrow signal indication is "green (permit to proceed)." However, since the amount of light of an arrow signal is smaller than that of a main signal, the arrow signal indication may not be accurately recognized until the vehicle 1 gets somewhat close to the traffic light. Automatically slowing down the vehicle 1 upon mere recognition of red light when an arrow signal indication is not recognized leads to a decrease in accuracy of autonomous driving control. In order to prevent such hasty autonomous driving control, it is desirable to first recognize whether there is an arrow signal. However, arrow signal housings are also hard to see at night. Accordingly, the probability of correctly recognizing the presence of an arrow signal decreases. That is, the accuracy of traffic light recognition decreases at night.

There is a similar problem with "shielded signals" that their indications cannot be seen until the vehicle gets somewhat close.

The above problem becomes more pronounced as the distance to the traffic light is greater. On the other hand, in order to implement deliberate autonomous driving control, it is also required to accurately recognize a traffic light from as far as about 100 m away. It is desirable to improve the accuracy of traffic light recognition as much as possible even at positions far from the traffic light.

Improving the accuracy of traffic light recognition that is based on the image IMG is also useful when the vehicle 1 is remotely assisted. When the vehicle 1 is remotely assisted, the image IMG obtained by the camera C is sent to a remote operator terminal of a remote operator. The remote operator terminal is equipped with a display device, and displays the received image IMG on the display device. The remote operator checks the surroundings of the vehicle 1 by looking at the image IMG displayed on the display device, and remotely assists the vehicle 1 in operation. Remote assistance by the remote operator includes, for example, recognition assistance, decision assistance, and remote driving. In any case, when a traffic light in the image IMG is less visible, the accuracy of remote assistance by the remote operator may decrease. Therefore, making a traffic light in the image IMG more visible is also desirable in view of the accuracy of remote assistance.

In view of the above, the present embodiment proposes a technique capable of improving the accuracy of traffic light recognition in a dark environment such as at night or in the evening. Specifically, the vehicle control system 10 according to the present embodiment uses a light 50 mounted on the vehicle 1 in order to improve the accuracy of traffic light recognition.

Figure 3:
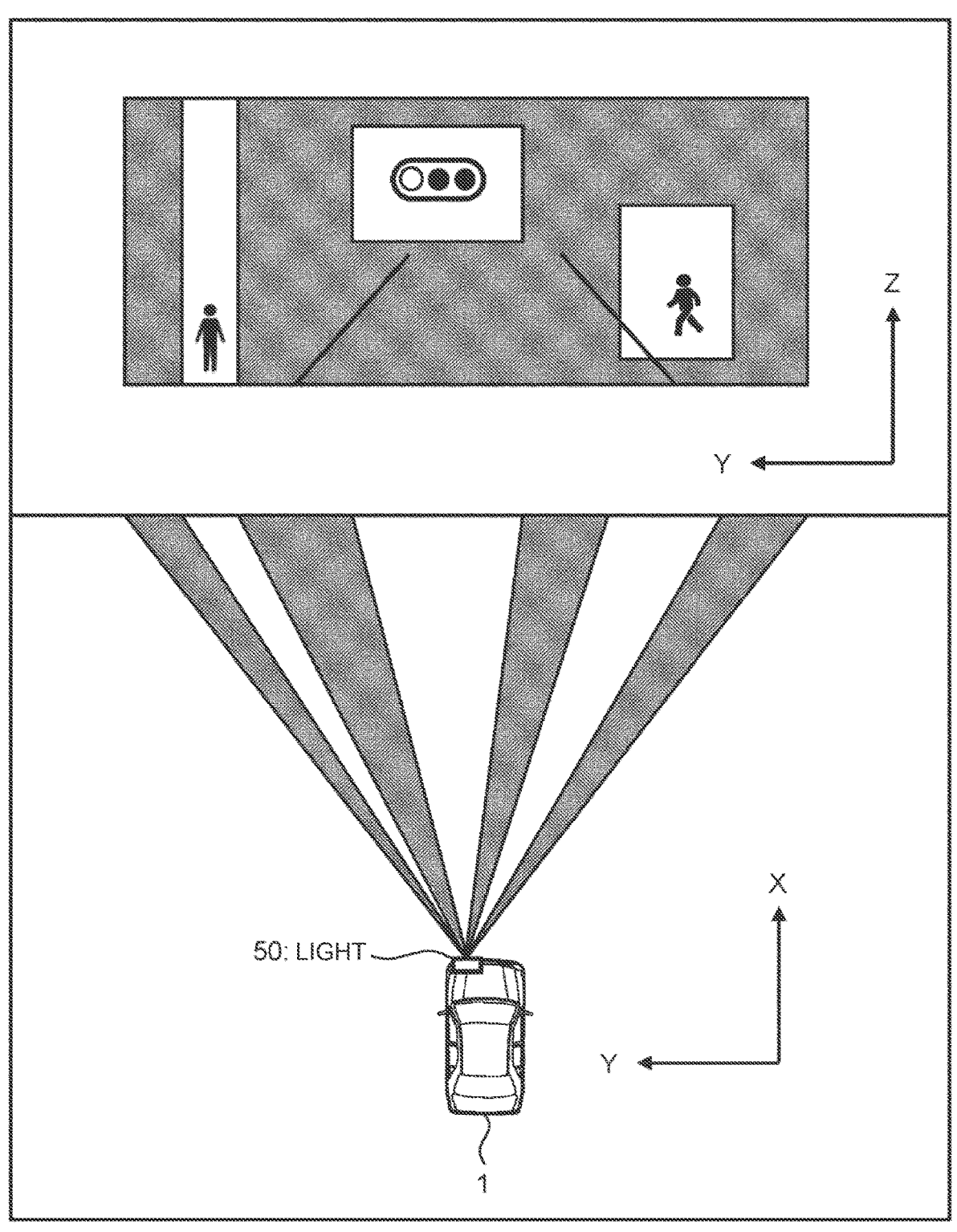
FIG. 3 is a conceptual diagram illustrating a light mounted on the vehicle according to the embodiment.

FIG. 3 is a conceptual diagram illustrating the light 50 mounted on the vehicle 1. The light 50 emits light to the outside of the vehicle 1. The light distribution state of the light 50 can be changed. That is, the light 50 is configured so that its irradiation range and radiation intensity can be changed as desired.

More specifically, the set maximum irradiation range of the light 50 is wide, and the irradiation range can be set as desired within the maximum irradiation range. That is, the light 50 is configured to be able to selectively illuminate only a part of the maximum irradiation range. For example, the light 50 includes a plurality of light sources. For example, when the light sources are light-emitting diodes (LEDs), the light 50 includes an LED array composed of a plurality of LEDs. The light sources can be independently controlled on and off. By independently controlling the light sources on and off, the irradiation range can be set as desired within the maximum irradiation range. As shown in FIG. 3, the irradiation range can be changed in both the horizontal direction (XY direction) and the vertical direction (Z direction).

The radiation intensity (output, power) of each of the light sources can be changed as desired. In order to reduce power consumption, the default value of the radiation intensity of each light source is typically set to a value less than the maximum radiation intensity. However, it is possible to temporarily increase or decrease the radiation intensity of each light source as needed.

For example, the light 50 is incorporated in a headlight of the vehicle 1. Particularly, the light 50 in this example is a high beam (a low beam is provided separately). A high beam can illuminate positions as high as traffic lights. A high beam can also illuminate at least up to about 100 m ahead of the vehicle 1. For example, the light 50 can be an adaptive high-beam system (AHS) mounted on recent vehicles.

Figure 4:
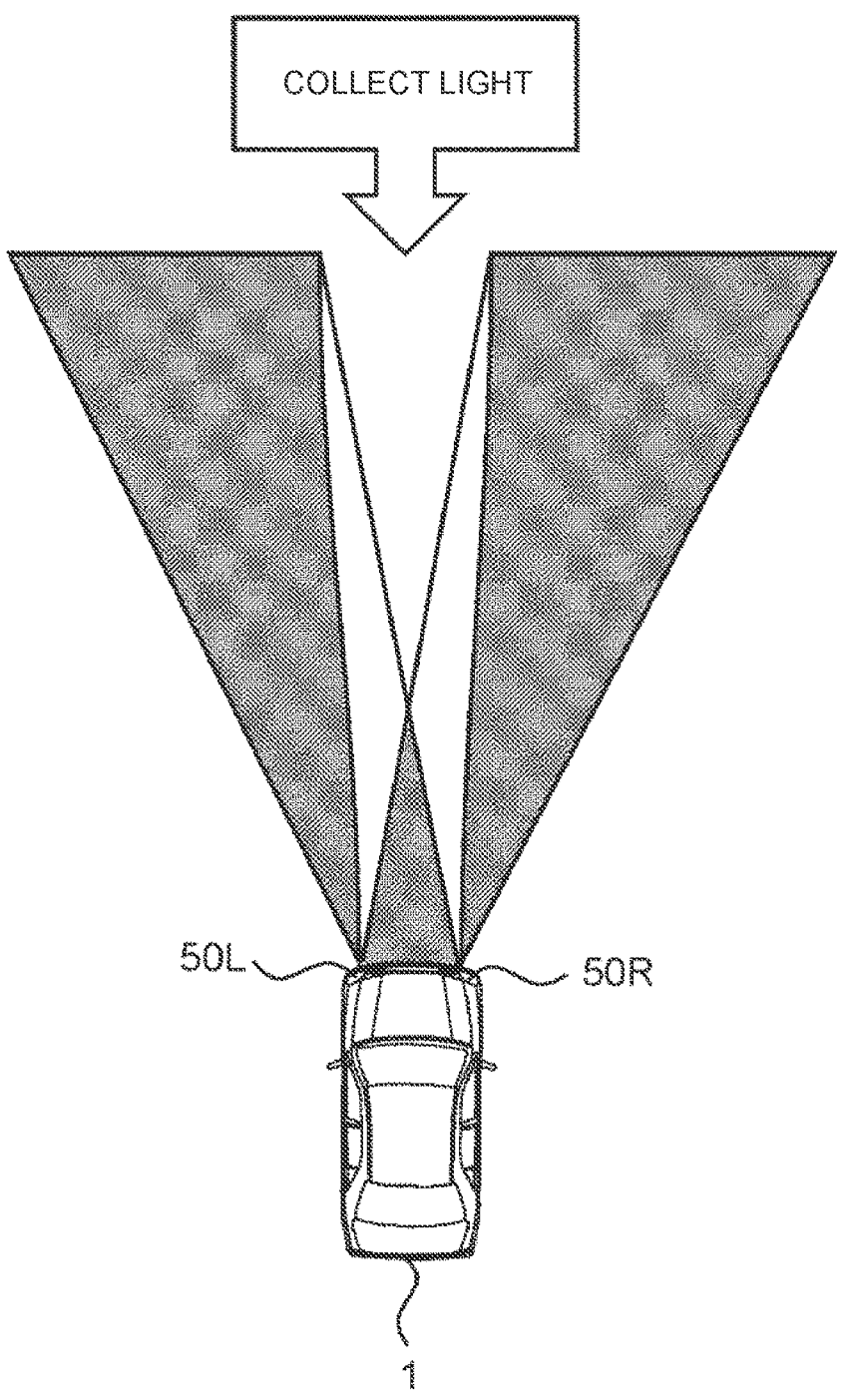
FIG. 4 is a conceptual diagram illustrating lights mounted on the vehicle according to the embodiment.

As shown in FIG. 4, the vehicle 1 may include a right light 50R and a left light 50L. It is also possible to "collect light" by superimposing the light emitted from the right light 50R and the light emitted from the left light 50L. The radiation intensity in a part of the irradiation range can be increased by collecting light.

The vehicle control system 10 according to the present embodiment performs a "light control process" of controlling the light 50 mounted on the vehicle 1. Particularly, the vehicle control system 10 performs the light control process such that the accuracy of traffic light recognition in a dark environment is improved. The light control process that is performed by the vehicle control system 10 according to the present embodiment will be described in more detail below.

2. Light Control Process

First, a "signal candidate position SC" used in the light control process will be described with reference to FIG. 5. The signal candidate position SC refers to a position around the vehicle 1 where there may be a traffic light. As used herein, the term "position" is a concept including "area" and "space." The "position" may be a position in real space or a position in the image IMG. The size of the signal candidate position SC is finite. The size of a single signal candidate position SC in the image IMG is smaller than the size of the entire image IMG.

The vehicle control system 10 recognizes (acquires) a signal candidate position SC around the vehicle 1 by using a sensor group 20 mounted on the vehicle 1.

For example, the sensor group 20 includes a recognition sensor 21 that recognizes the surroundings of the vehicle 1. Examples of the recognition sensor 21 include the camera C and a laser imaging detection and ranging (LIDAR). The vehicle control system 10 recognizes a signal candidate position SC based on the recognition result from the recognition sensor 21. At this time, evidence is not necessarily required that there is a traffic light at the signal candidate position SC. When light, an object, etc. associated with a traffic light is recognized, its recognized position may be acquired as a signal candidate position SC.

As another example, the sensor group 20 includes a position sensor 23 that acquires the position of the vehicle 1. An example of the position sensor 23 is a Global Positioning System (GPS) sensor. Traffic lights are likely to be installed at intersections. Therefore, the vehicle control system 10 may acquire the position of an intersection around the vehicle 1 based on position information of the vehicle 1 and map information, and recognize the position of the intersection as a signal candidate position SC.

There are also various other methods to recognize a signal candidate position SC. Various examples of the method for recognizing a signal candidate position SC will be described later.

The vehicle control system 10 recognizes (acquires) one or more signal candidate positions SC around the vehicle 1. There are cases where a plurality of signal candidate positions SC is recognized at the same time. The vehicle control system 10 performs the light control process in response to recognition of the signal candidate position(s) SC. Hereinafter, various examples of the light control process will be described.

2-1. Brightening Process

Figure 6:
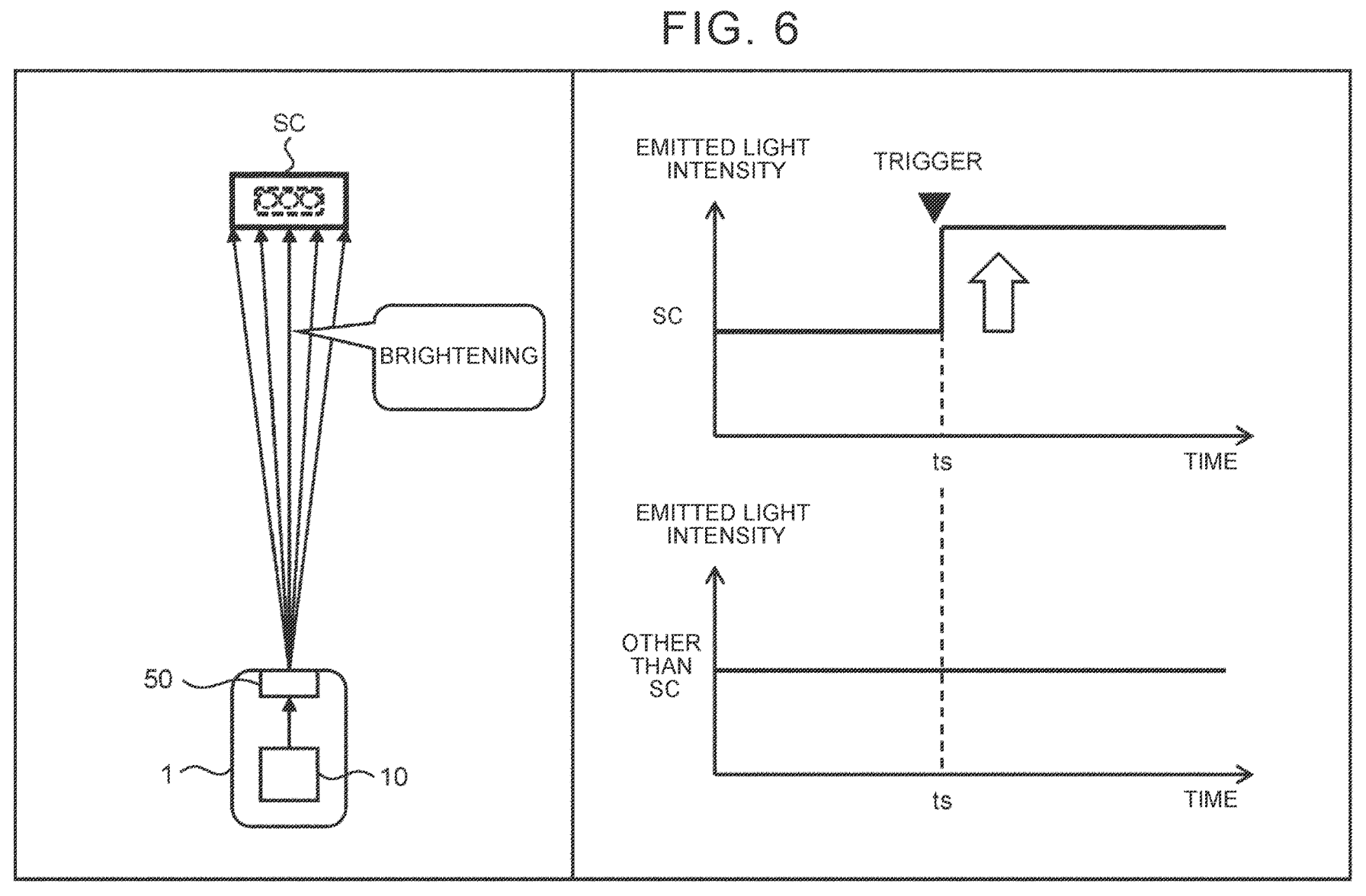

FIG. 6 is a conceptual diagram illustrating a "brightening process" that is an example of the light control process. The brightening process is a process of increasing the intensity of the light (output of the light 50) emitted to a signal candidate position SC in response to a certain trigger. In this example, the trigger is recognition of a signal candidate position SC. That is, in response to recognition of a signal candidate position SC, the vehicle control system 10 increases the intensity of the light emitted to the signal candidate position SC to a value higher than before the recognition of the signal candidate position SC.

In the example shown in FIG. 6, the intensity of the light emitted to the signal candidate position SC increases at time ts. Time ts is when the signal candidate position SC is recognized, or immediately after the recognition of the signal candidate position SC. The intensity of the light emitted to the area other than the signal candidate position SC remains unchanged. Typically, the intensity of the light emitted to the signal candidate positions SC becomes higher than that of the light emitted to the area other than the signal candidate positions SC after time ts.

For example, the light 50 (high beam) is off before time ts. Thereafter, in response to recognition of a signal candidate position SC, the vehicle control system 10 partially turns on the light 50 so as to illuminate only the recognized signal candidate position SC. That is, the vehicle control system 10 selectively illuminates the signal candidate position SC without illuminating the area other than the signal candidate position SC. Such a light control process can also be called "selective lighting."

As another example, the light 50 may be on before time ts. Typically, the radiation intensity before time ts is the default value. Thereafter, in response to recognition of a signal candidate position SC, the vehicle control system 10 may increase the radiation intensity for the recognized signal candidate position SC to a value higher than the default value.

If an object such as a traffic light is irradiated more intensely than necessary, the object may rather become less visible due to factors such as reflected light and flare. Therefore, the radiation intensity for the signal candidate position SC does not necessarily have to be increased to the maximum radiation intensity. An appropriate target radiation intensity may be calculated in advance through simulations, experiments, etc. In that case, the vehicle control system 10 performs the light control process so that the radiation intensity for the signal candidate position SC becomes the appropriate target radiation intensity.

The brightening process described above provides the following effects.

First, the intensity of the light emitted to the signal candidate position SC is increased, so that the brightness (illuminance) of the signal candidate position SC increases. Therefore, when there is actually a traffic light at the signal candidate position SC, the brightness of the housing of that traffic light also increases, and the housing of that traffic light becomes more visible. Therefore, it becomes easier to recognize (detect) the presence of a traffic light based on the image IMG even in a dark environment. As a result, the probability of recognizing (detecting) a traffic light based on the image IMG increases. That is, the accuracy of traffic light recognition is improved.

A high beam can illuminate at least up to about 100 m ahead of the vehicle 1. Therefore, even when the vehicle 1 is about 100 m away from a traffic light, the traffic light is brightened, so that visibility of the traffic light can be improved. That is, it is possible to increase the accuracy of traffic light recognition even at positions far from the traffic light. This is desirable in terms of implementing deliberate autonomous driving control.

Moreover, when the light emitted to the signal candidate position SC becomes more intense than the light emitted to the area other than the signal candidate position SC, the contrast of the image IMG increases. The signal candidate position SC can be made more visible by removing noise light at positions other than the signal candidate position SC from the image IMG through a filter etc. This also contributes to an increase in probability of recognizing (detecting) a traffic light based on the image IMG. Since the noise light is removed, the noise light is less likely to be misrecognized as a traffic light. That is, the accuracy of traffic light recognition is improved.

Improvement in accuracy of traffic light recognition contributes to improvement in accuracy of autonomous driving control that is based on the result of traffic light recognition.

Brightening the signal candidate position SC is also useful for remote assistance by the remote operator. In the remote assistance, the image IMG obtained by the camera C is sent to the remote operator terminal of the remote operator. The remote operator checks the surroundings of the vehicle 1 by looking at the image IMG. At this time, if the signal candidate position SC in the image IMG is bright, the remote operator can easily recognize whether there is a traffic light. Moreover, the remote operator can easily recognize whether there is an arrow signal or a shielded signal, even when a signal indication is not visible. These are desirable in terms of the accuracy of remote assistance.

2-2. Dimming Process

Figure 7:
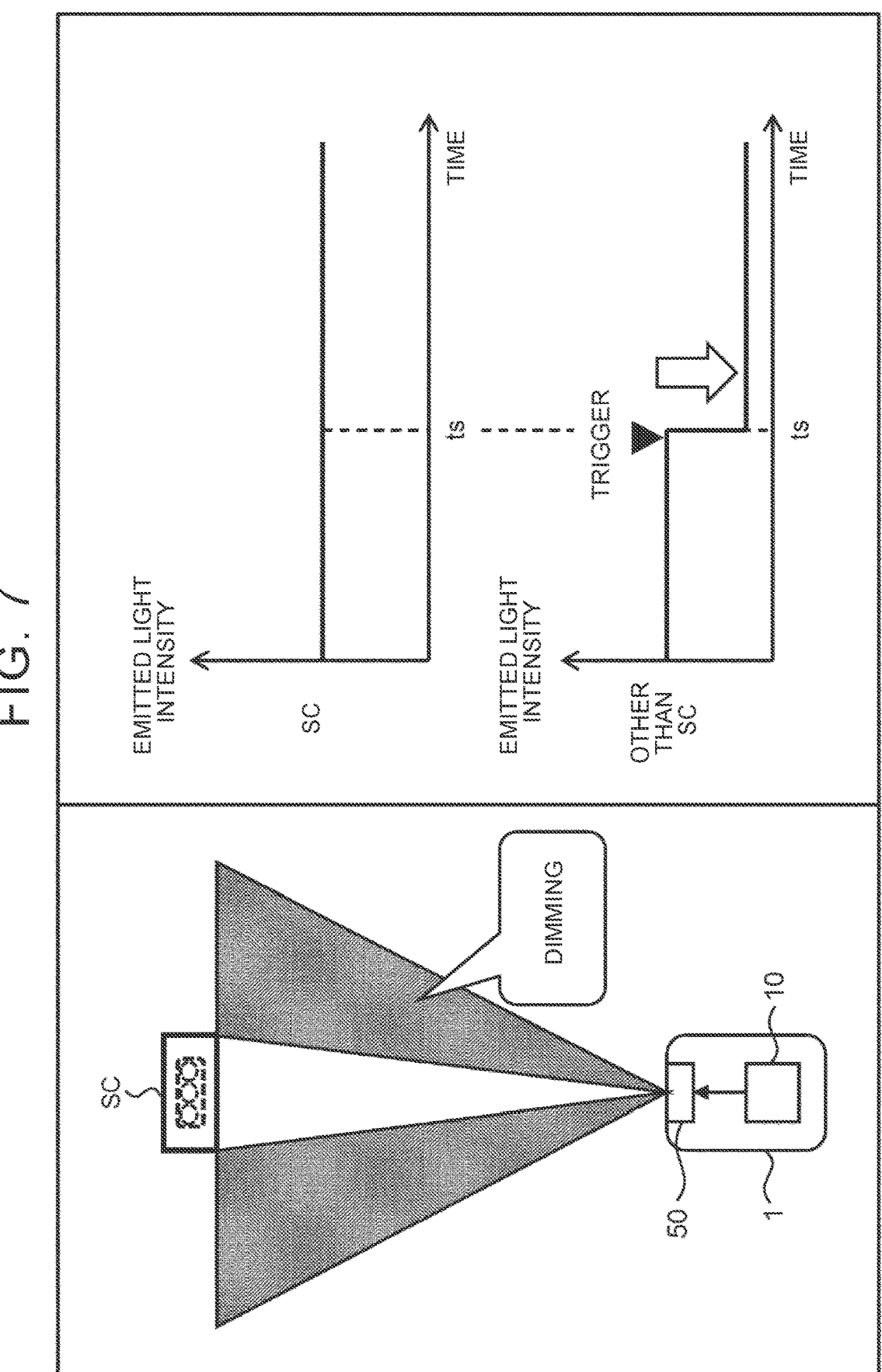
FIG. 7 is a conceptual diagram illustrating another example of the light control process according to the embodiment.

FIG. 7 is a conceptual diagram illustrating a "dimming process" that is another example of the light control process. The dimming process is a process of reducing the intensity of the light (output of the light 50) emitted to the area other than a signal candidate position SC in response to a certain trigger. In this example, the trigger is recognition of a signal candidate position SC. That is, in response to recognition of a signal candidate position SC, the vehicle control system 10 reduces the intensity of the light emitted to the area other than the signal candidate position SC to a value lower than before the recognition of the signal candidate position SC.

In the example shown in FIG. 7, the light 50 (high beam) is on before time ts. Typically, the radiation intensity before time ts is the default value. The intensity of the light emitted to the area other than the signal candidate position SC then decreases at time ts. The light 50 may be partially turned off so that the area other than the signal candidate position SC will not be illuminated. The intensity of the light emitted to the signal candidate position SC remains unchanged. As a result, as in the example shown in FIG. 6, the light emitted to the signal candidate position SC becomes more intense than the light emitted to the area other than the signal candidate position SC.

This dimming process provides the following effects.

Since the light emitted to the signal candidate position SC becomes more intense than the light emitted to the area other than the signal candidate position SC, the contrast of the image IMG increases. The signal candidate position SC can be made more visible by removing noise light at positions other than the signal candidate position SC from the image IMG through a filter etc. This also contributes to an increase in probability of recognizing (detecting) a traffic light based on the image IMG. Since the noise light is removed, the noise light is less likely to be misrecognized as a traffic light. That is, the accuracy of traffic light recognition is improved.

Reflectors are often attached to roads or roadside structures. Reflected light from such reflectors becomes noise light for signal recognition. Dimming the light emitted to the area other than the signal candidate position SC can reduce generation of noise light. The accuracy of traffic light recognition is thus improved.

Moreover, the light emitted to the area other than the signal candidate position SC becomes less intense, and the brightness (illuminance) of the positions other than the signal candidate position SC decreases. Therefore, objects at positions other than the signal candidate position SC become less visible. As a result, the probability of misrecognizing an object other than a traffic light as a traffic light is reduced. This also contributes to improvement in accuracy of traffic light recognition.

Moreover, partially dimming the emitted light can reduce power consumption.

2-3. Combination of Brightening and Dimming Processes

Figure 8:
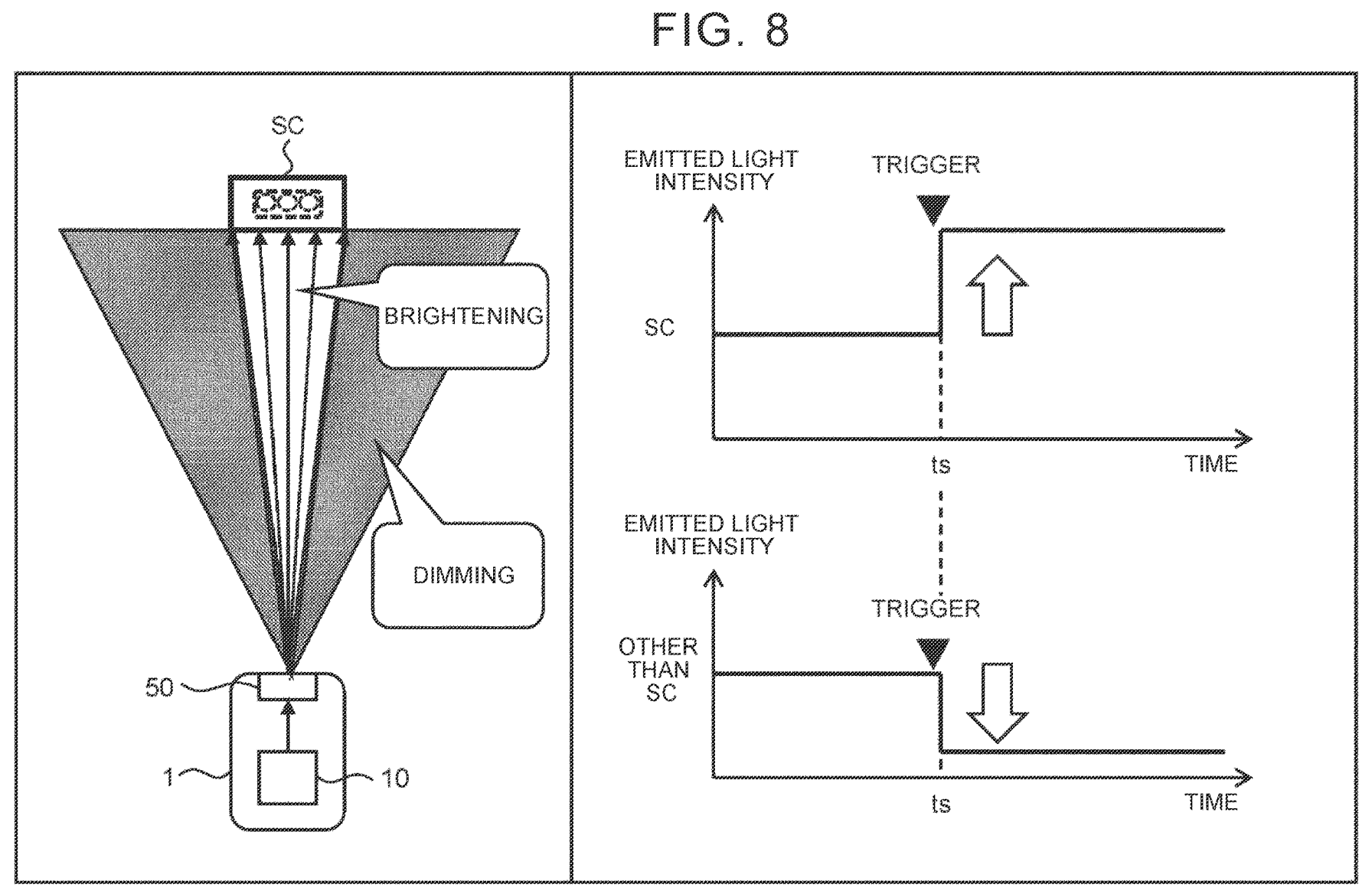

FIG. 8 shows a combination of the above "brightening process" and the "dimming process." In response to recognition of a signal candidate position SC, the vehicle control system 10 increases the intensity of the light emitted to the signal candidate position SC to a value higher than before the recognition of the signal candidate position SC, and reduces the intensity of the light emitted to the area other than the signal candidate position SC to a value lower than before the recognition of the signal candidate position SC. This combination provides both the effects of the brightening process and the effects of the dimming process.

2-4. Attenuation Process Following Brightening Process

Figure 9:
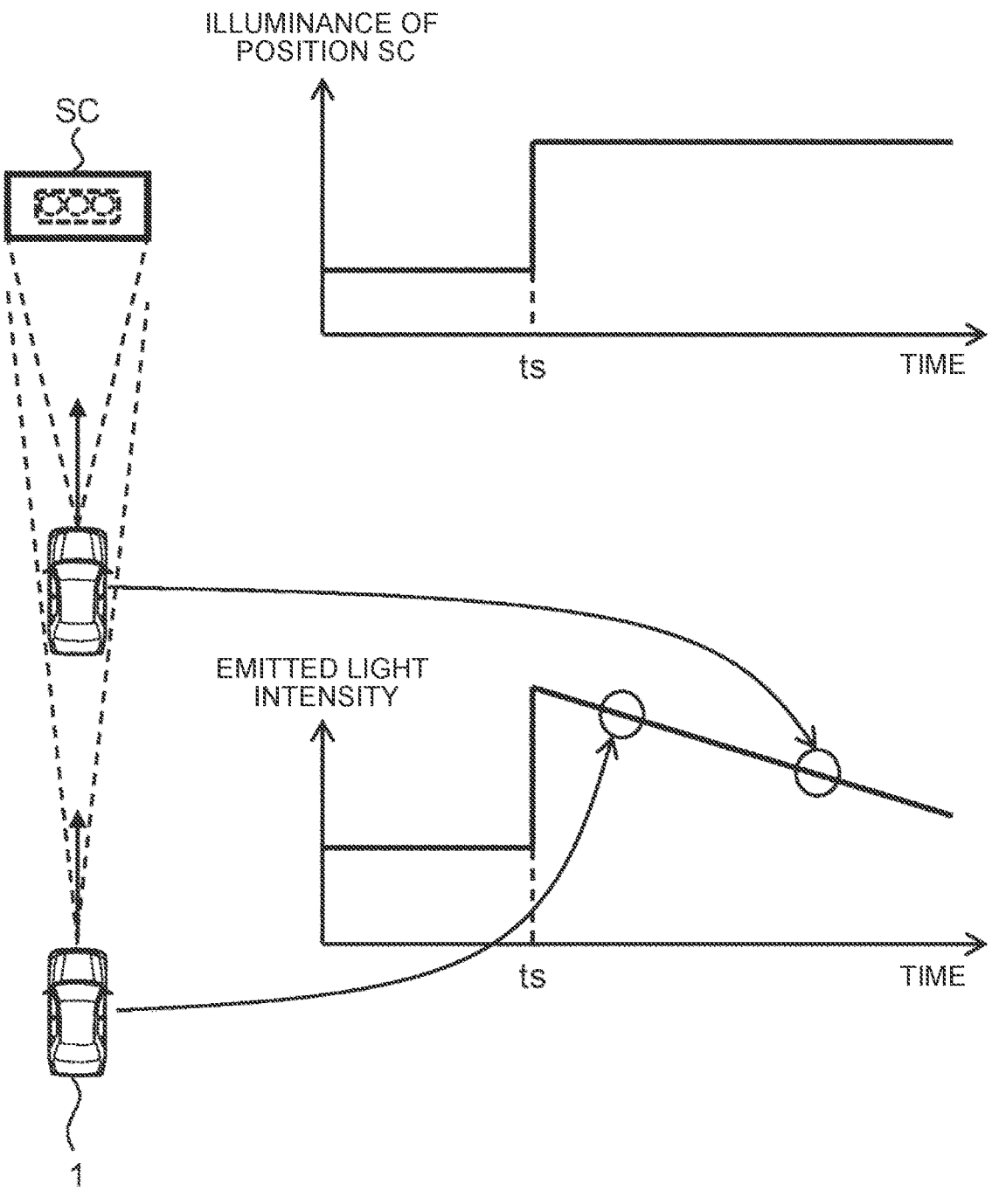
FIG. 9 is a conceptual diagram illustrating yet another example of the light control process according to the embodiment.

FIG. 9 is a conceptual diagram illustrating an "attenuation process" following the brightening process. As described above, the brightening process increases the intensity of the light emitted to the signal candidate position SC and thus increases the illuminance of the signal candidate position SC. Thereafter, the vehicle 1 travels and approaches the signal candidate position SC. When the intensity of the light output from the light 50 of the vehicle 1 does not change, the illuminance of the signal candidate position SC increases as the vehicle 1 approaches the signal candidate position SC. However, if an object such as a traffic light is irradiated more intensely than necessary, the object may rather become less visible due to factors such as reflected light and flare.

Therefore, in order to prevent the signal candidate position SC from being irradiated more intensely than necessary, the vehicle control system 10 may perform the attenuation process following the brightening process. Specifically, after the brightening process, the vehicle control system 10 attenuates the light emitted to the signal candidate position SC as the vehicle 1 travels.

The attenuation rate of the emitted light intensity in the attenuation process may be dynamically set according to the speed of the vehicle 1. In this case, the attenuation rate of the emitted light intensity is set to increase as the speed of the vehicle 1 increases.

The emitted light intensity in the attenuation process may be set according to the distance from the vehicle 1 to the signal candidate position SC. In this case, the emitted light intensity is set to decrease as the distance from the vehicle 1 to the signal candidate position SC decreases.

The emitted light intensity of the light 50 on the output side may be set so that the illuminance of the signal candidate position SC on the light-receiving side has a constant value during the attenuation process. The constant value is the illuminance that allows appropriate signal recognition.

By the attenuation process described above, the signal candidate position SC is less likely to be irradiated more intensely than necessary after the brightening process. As a result, the possibility of an object such as a traffic light becoming less visible is reduced. This also contributes to improvement in accuracy of traffic light recognition.

2-5. Effects

As described above, according to the present embodiment, a signal candidate position SC around the vehicle 1 where there may be a traffic light is recognized. The light control process described above is performed in response to the recognition of the signal candidate position SC. The light control process includes either or both of: increasing the intensity of the light emitted to the signal candidate position SC to a value higher than before the recognition of the signal candidate position SC; and making the intensity of the light emitted to the signal candidate position SC higher than that of the light emitted to the area other than the signal candidate position SC. This light control process makes the signal candidate position more visible even in a dark environment, and increases the probability of recognizing (detecting) a traffic light in a dark environment. That is, the accuracy of traffic light recognition is improved.

3. Screening Process

As described above, the light control process is performed in response to recognition of a signal candidate position SC. This light control process is hereinafter referred to as "first light control process" for convenience. The first light control process increases the accuracy of traffic light recognition that is based on the image IMG. As a result, in some cases, it turns out that there is actually a traffic light at the signal candidate position SC, or that the possibility that there is a traffic light at the signal candidate position SC is very high. In other cases, it turns out that there is no traffic light at the signal candidate position SC, or that the possibility that there is a traffic light at the signal candidate position SC is very low. It is therefore possible to further narrow down the signal candidate position(s) SC after the first light control process. In other words, it is possible to screen the signal candidate position(s) SC.

Figure 10:
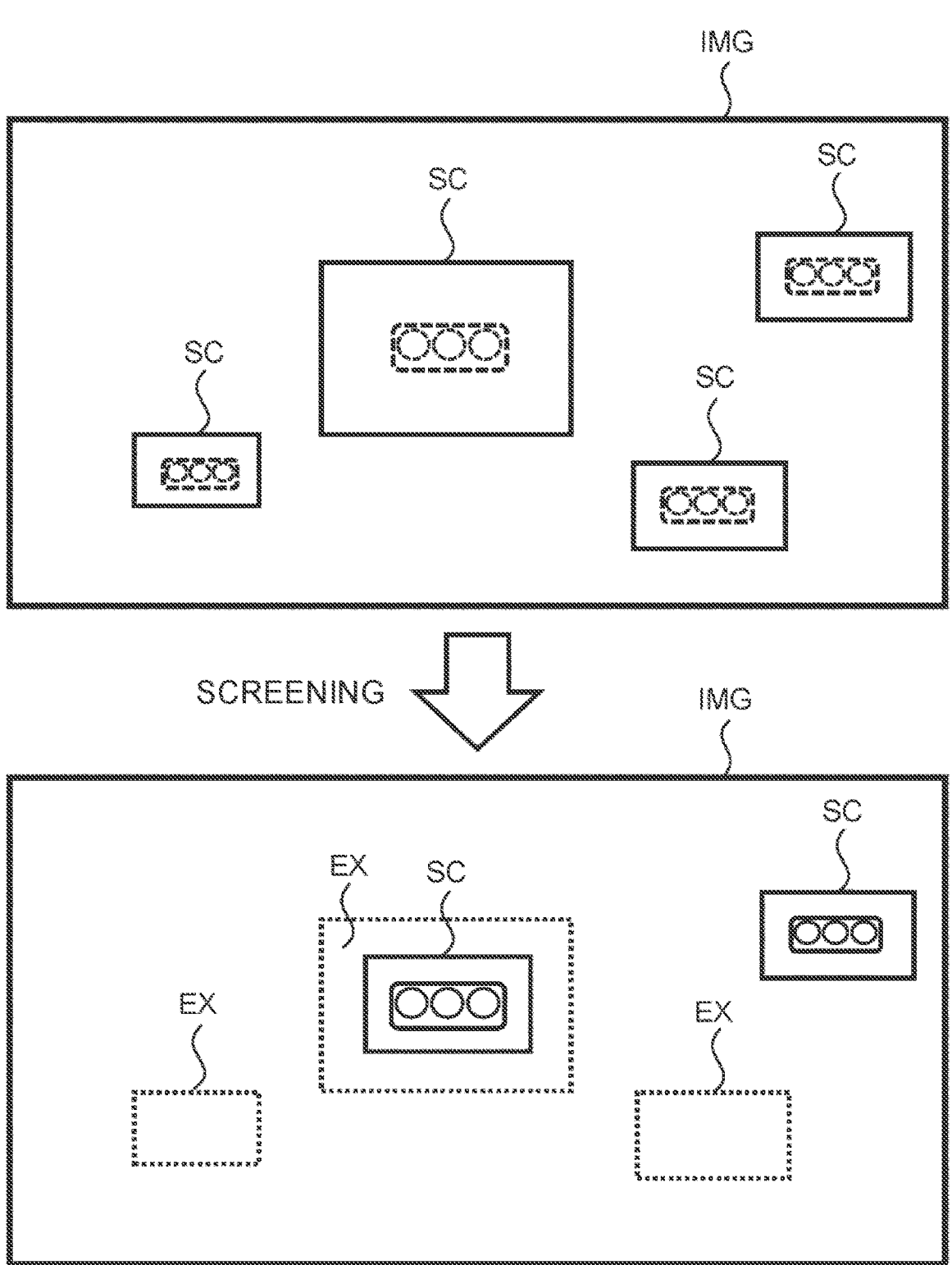
FIG. 10 is a conceptual diagram illustrating a screening process according to the embodiment.

FIG. 10 is a conceptual diagram illustrating the screening process. The image IMG obtained by the camera C includes one or more signal candidate positions SC. After the first light control process, the vehicle control system 10 further performs signal recognition based on the image IMG to narrow down the signal candidate position(s) SC. At this time, the vehicle control system 10 may narrow down the "number" of the signal candidate positions SC, or may narrow down the "size" of the signal candidate position SC.

For example, when the vehicle control system 10 determines that there is no traffic light at a certain signal candidate position SC or that the possibility that there is a traffic light at a certain signal candidate position SC is less than a threshold, the vehicle control system 10 excludes that signal candidate position SC from signal candidate positions SC for the subsequent processes. As another example, when the vehicle control system 10 determines that there is no traffic light in at least a part of the range of a certain signal candidate position SC, or that the possibility that there is a traffic light in at least a part of the range of a certain signal candidate position SC is less than a threshold, the vehicle control system 10 excludes this part of the range of the signal candidate position SC from the signal candidate position SC.

The position excluded from the signal candidate position(s) SC by the screening process is hereinafter referred to as "excluded position EX." The possibility that there is a traffic light at the excluded position EX is low. On the other hand, the possibility that there is a traffic light at the signal candidate position(s) SC after the screening process is high.

By narrowing down the signal candidate position(s) SC to the signal candidate position(s) SC where a traffic light is highly likely to present, a traffic light can be more accurately and more quickly recognized. That is, the screening process can increase both the accuracy of traffic light recognition and the speed of traffic light recognition.

The vehicle control system 10 may further perform the light control process following the screening process. The light control process performed after the screening process is hereinafter referred to as "second light control process" for convenience. The second light control process is triggered by execution of the screening process.

For example, there is no need to keep illuminating the excluded position EX excluded from the signal candidate position(s) SC. Continuing to illuminate the excluded position EX may cause generation of unnecessary noise light and misrecognition of an object other than a traffic light as a traffic light. Therefore, in the second light control process, the vehicle control system 10 performs a dimming process (see FIGS. 7 and 8) on the excluded position EX. That is, the vehicle control system 10 reduces the intensity of the light emitted to the excluded position EX to a value lower than before the screening process. This dimming process provides the effects described above, and further improves the accuracy of traffic light recognition.

As another example, in the second light control process, the vehicle control system 10 may further perform a brightening process (see FIGS. 6 and 8) on the signal candidate position(s) SC. That is, the vehicle control system 10 may increase the intensity of the light emitted to the signal candidate position SC to a value even higher than before the screening process. At this time, the vehicle control system 10 may "collect light" using the right light 50R and the left light 50L shown in FIG. 4 to increase the intensity of the light emitted to the signal candidate position SC. This brightening process provides the effects described above, and further improves the accuracy of traffic light recognition.

The vehicle control system 10 may further perform an attenuation process (see FIG. 9) following the brightening process. By this attenuation process, the signal candidate position(s) SC is less likely to be irradiated more intensely than necessary after the brightening process. As a result, the possibility of an object such as a traffic light becoming less visible is reduced. This also contributes to improvement in accuracy of traffic light recognition.

4. Examples of Irradiation Target

Figure 11:
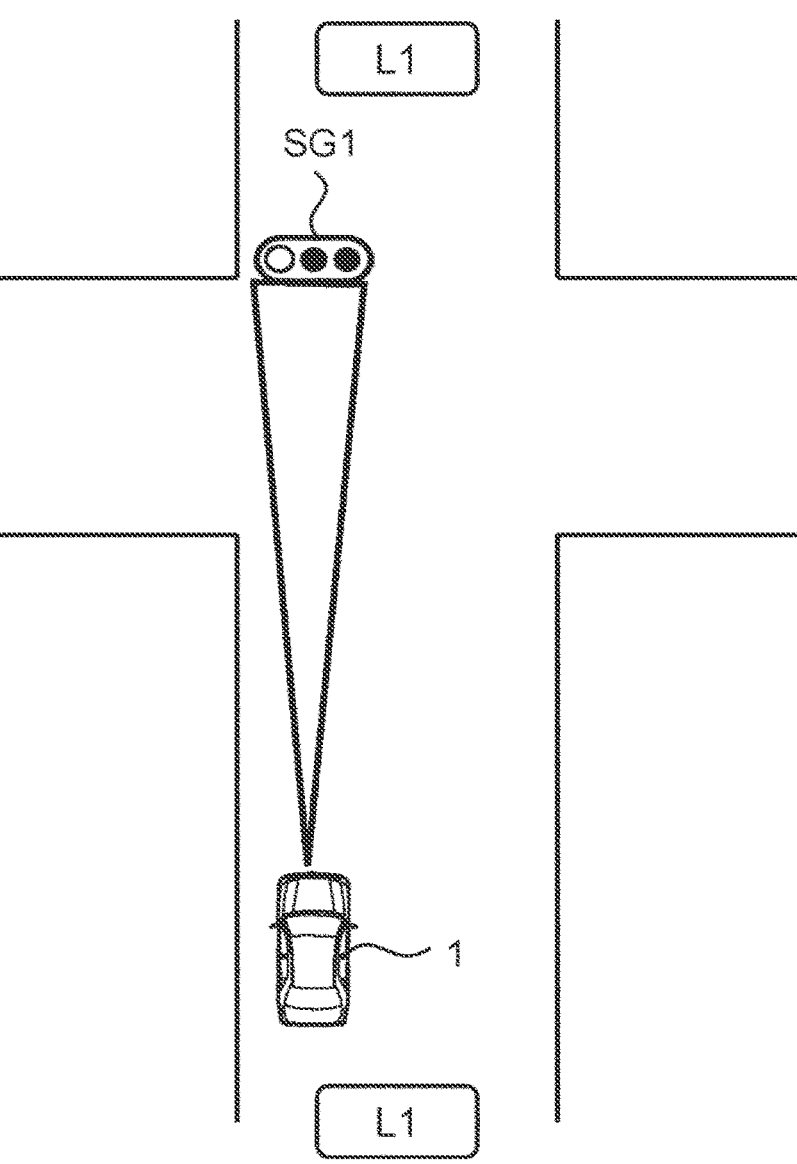
FIG. 11 is a conceptual diagram illustrating an example of a traffic light that is an irradiation target according to the embodiment.

FIG. 11 is a conceptual diagram illustrating an example of a traffic light that is an irradiation target in the present embodiment. A first lane L1 is a lane in which the vehicle 1 is traveling. A first traffic light SG1 is a traffic light for the first lane L1. Particularly, the first traffic light SG1 is located ahead of the vehicle 1. The vehicle 1 travels according to the signal indication of the first traffic light SG1. At least the first traffic light SG1 is an irradiation target. The signal candidate position SC includes a position where there may be the first traffic light SG1.

Figure 12:
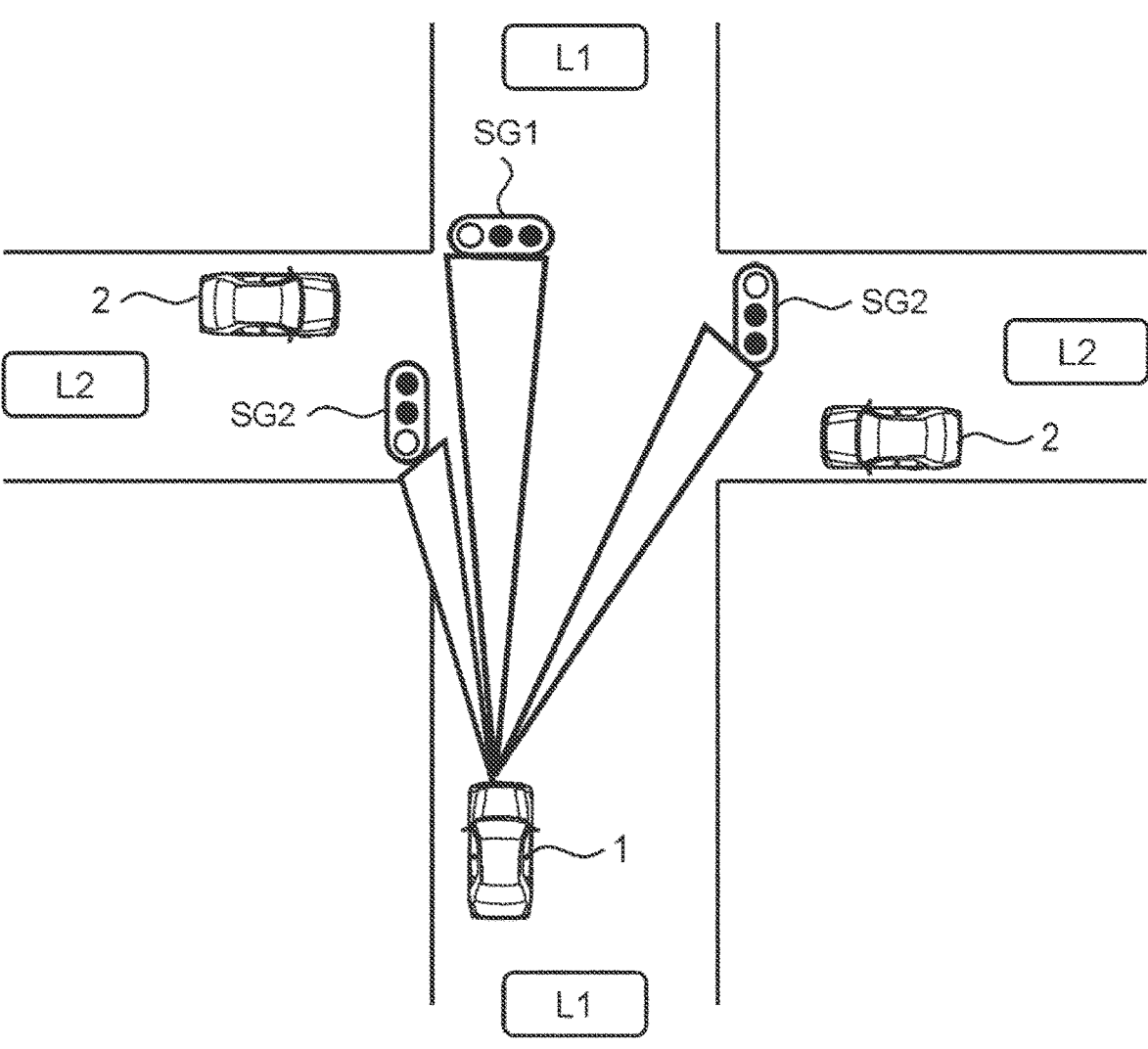
FIG. 12 is a conceptual diagram illustrating another example of traffic lights that are irradiation targets according to the embodiment.

FIG. 12 is a conceptual diagram illustrating another example of traffic lights that are irradiation targets according to the present embodiment. A second lane L2 is a lane that crosses the first lane L1. There are other vehicles 2 in the second lane L2. Second traffic lights SG2 are traffic lights for the second lane L2. The other vehicles 2 travel according to the signal indications of the second traffic lights SG2. The second traffic lights SG2 may also be irradiation targets. That is, the signal candidate positions SC may include not only a position where there may be the first traffic light SG1, but also a position where there may be the second traffic light SG2. The vehicle control system 10 of the vehicle 1 in the first lane L1 also illuminates the second traffic lights SG2 for the second lane L2. This makes it easier for the other vehicles 2 in the second lane L2 to recognize the second traffic lights SG2. That is, the vehicle control system 10 of the vehicle 1 can assist the other vehicles 2 in signal recognition.

5. Example of Vehicle Control System

5-1. Configuration Example

FIG. 13 is a block diagram showing an example of the configuration of the vehicle control system 10 according to the present embodiment. The vehicle control system 10 includes the sensor group 20, a driving device 30, a communication device 40, the light 50, and a control device 100.

The sensor group 20 is mounted on the vehicle 1. The sensor group 20 includes the recognition sensor 21, a vehicle state sensor 22, the position sensor 23, etc.

The recognition sensor 21 recognizes (detects) the surroundings of the vehicle 1. The recognition sensor 21 includes the camera C. The recognition sensor 21 may include a laser imaging detection and ranging (LIDAR), a radar, etc.

The vehicle state sensor 22 detects the state of the vehicle 1. The vehicle state sensor 22 includes, for example, a speed sensor, an acceleration sensor, a yaw rate sensor, and a steering angle sensor.

The position sensor 23 detects the position and orientation of the vehicle 1. An example of the position sensor 23 is a Global Positioning System (GPS) sensor.

The driving device 30 includes a steering device, a drive device, and a braking device. The steering device steers wheels. For example, the steering device includes an electric power steering (EPS) system. The drive device is a power source that generates a driving force. Examples of the drive device include an engine, an electric motor, and in-wheel motors. The braking device generates a braking force.

The communication device 40 communicates with the outside of the vehicle 1. For example, the communication device 40 communicates with a management device external to the vehicle 1. Examples of the management device include a map management device that manages map information and an autonomous driving management device that manages autonomous driving of the vehicle 1. As still another example, the communication device 40 may communicate with the remote operator terminal that provides remote assistance of the vehicle 1.

The light 50 is mounted on the vehicle 1, and emits light to the outside of the vehicle 1. The light distribution state of the light 50 can be changed. That is, the light 50 is configured so that its irradiation range and radiation intensity can be changed as desired. For example, the light 50 includes a plurality of light sources. When the light sources are LEDs, the light 50 includes an LED array composed of a plurality of LEDs. The light sources can be independently controlled.

The control device 100 controls the vehicle 1. The control device 100 includes one or more processors 110 (hereinafter simply referred to as "processor 110") and one or more storage devices 120 (hereinafter simply referred to as "storage device 120"). The processor 110 performs various processes. For example, the processor 110 includes a central processing unit (CPU). The storage device 120 stores various kinds of information. Examples of the storage device 120 include a volatile memory, a nonvolatile memory, a hard disk drive (HDD), and a solid state drive (SSD). The control device 100 may include one or more electronic control units (ECUs). A part of the control device 100 may be an information processing device external to the vehicle 1. In that case, the part of the control device 100 communicates with the vehicle 1 to remotely control the vehicle 1.

A vehicle control program PROG is a computer program for controlling the vehicle 1. The various processes that are performed by the control device 100 are implemented by the processor 110 executing the vehicle control program PROG. The vehicle control program PROG is stored in the storage device 120. Alternatively, the vehicle control program PROG may be recorded on a computer-readable recording medium.

5-2. Driving Environment Information

The control device 100 acquires driving environment information 200 by using the sensor group 20. The driving environment information 200 indicates the driving environment of the vehicle 1. The driving environment information 200 is stored in the storage device 120.

Figure 14:
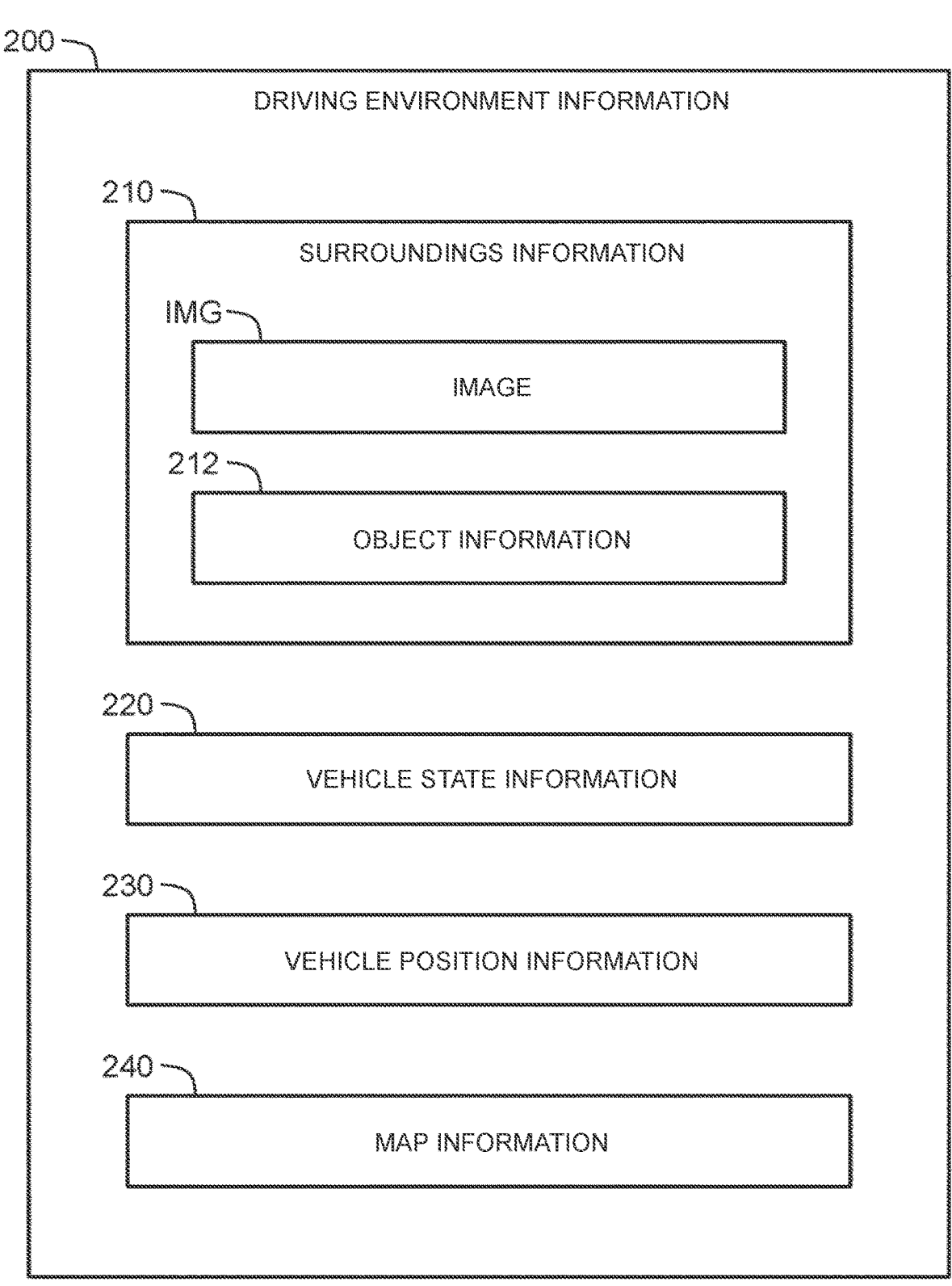
FIG. 14 is a block diagram showing an example of driving environment information according to the embodiment.

FIG. 14 is a block diagram showing an example of the driving environment information 200. The driving environment information 200 includes surroundings information 210, vehicle state information 220, vehicle position information 230, and map information 240.

The surroundings information 210 is information indicating the surroundings of the vehicle 1. The control device 100 recognizes the surroundings of the vehicle 1 using the recognition sensor 21, and acquires the surroundings information 210. For example, the surroundings information 210 includes the image IMG captured by the camera C. As another example, the surroundings information 210 includes point group information obtained by the LIDAR.

The surroundings information 210 further includes object information 212 on an object around the vehicle 1. Examples of the object around the vehicle 1 include pedestrians, bicycles, motorcycles, other vehicles (e.g., preceding vehicles and parked vehicles), white lines, traffic lights, structures (e.g., utility poles and pedestrian bridges), traffic signs, and obstacles. The object information 212 indicates the relative position and relative speed of the object with respect to the vehicle 1. For example, the object can be identified and the relative position of the object can be calculated by analyzing the image IMG obtained by the camera C. For example, the control device 100 identifies the object in the image IMG, such as a traffic light, by using the image recognition AI obtained by machine learning. Alternatively, the object can be identified and the relative position and relative speed of the object can be acquired based on the point group information obtained by the LIDAR.

The vehicle state information 220 is information indicating the state of the vehicle 1, and includes, for example, vehicle speed, acceleration, yaw rate, and steering angle. The control device 100 acquires the vehicle state information 220 from the vehicle state sensor 22. The vehicle state information 220 may indicate the driving state (manual driving or autonomous driving) of the vehicle 1.

The vehicle position information 230 is information indicating the current position of the vehicle 1. The control device 100 acquires the vehicle position information 230 from the detection result from the position sensor 23. The control device 100 may acquire accurate vehicle position information 230 by a well-known localization process using the object information 212 and the map information 240.

The map information 240 includes a common navigation map. The map information 240 may indicate lane arrangements and road shapes. The map information 240 may include position information of structures, traffic lights, and traffic signs, etc. The control device 100 acquires the map information 240 of a necessary area from a map database. The map database may be stored in the storage device 120, or may be stored in the map management device external to the vehicle 1. In the latter case, the control device 100 communicates with the map management device via the communication device 40 to acquire necessary map information 240. The map information 240 is stored in the storage device 120.

5-3. Vehicle Driving Control

The control device 100 performs "vehicle driving control" for controlling driving of the vehicle 1. The vehicle driving control includes steering control, acceleration control, and deceleration control. The control device 100 performs the vehicle driving control by controlling the driving device 30. Specifically, the control device 100 performs the steering control by controlling the steering device. The control device 100 performs the acceleration control by controlling the drive device. The control device 100 performs the deceleration control by controlling the braking device.

The control device 100 performs autonomous driving control based on the driving environment information 200. More specifically, the control device 100 generates a travel plan for the vehicle 1 based on the driving environment information 200. The travel plan includes keeping the current lane, changing lanes, making a right or left turn, avoiding an obstacle, etc. The control device 100 also generates a target trajectory that is necessary for the vehicle 1 to travel according to the travel plan, based on the driving environment information 200. The target trajectory includes a target position and a target speed. The control device 100 then performs the vehicle driving control so that the vehicle 1 follows the target trajectory.

5-4. Communication Process

The control device 100 communicates with the outside of the vehicle 1 via the communication device 40. For example, the control device 100 communicates with a management device external to the vehicle 1 via the communication device 40. Examples of the management device include a map management device that manages map information and an autonomous driving management device that manages autonomous driving of the vehicle 1. The control device 100 may perform vehicle-to-vehicle communication with other vehicle via the communication device 40.

When the vehicle 1 is an object to be remotely assisted by the remote operator, the control device 100 communicates with the remote operator terminal of the remote operator via the communication device 40. Remote assistance by the remote operator includes, for example, recognition assistance, decision assistance, and remote driving. When the control device 100 determines that remote assistance by the remote operator is necessary, the control device 100 sends a request for assistance to the remote operator terminal. The control device 100 also sends at least a part of the driving environment information 200 to the remote operator terminal. Particularly, the control device 100 sends the image IMG obtained by the camera C to the remote operator terminal. The remote operator terminal displays the received image IMG on the display device. The remote operator checks the surroundings of the vehicle 1 by looking at the image IMG displayed on the display device, and remotely assists the vehicle 1 in operation. The control device 100 receives instruction information indicating instructions of the remote operator from the remote operator terminal. The control device 100 then performs the vehicle driving control according to the instruction information.

5-5. Light Control Process

The control device 100 performs the light control process of controlling the light 50. As described above, the light distribution state of the light 50 can be changed. That is, the light 50 is configured so that its irradiation range and radiation intensity can be changed as desired. The control device 100 can change the irradiation range and radiation intensity of the light 50 by controlling the light 50.

Figure 15:
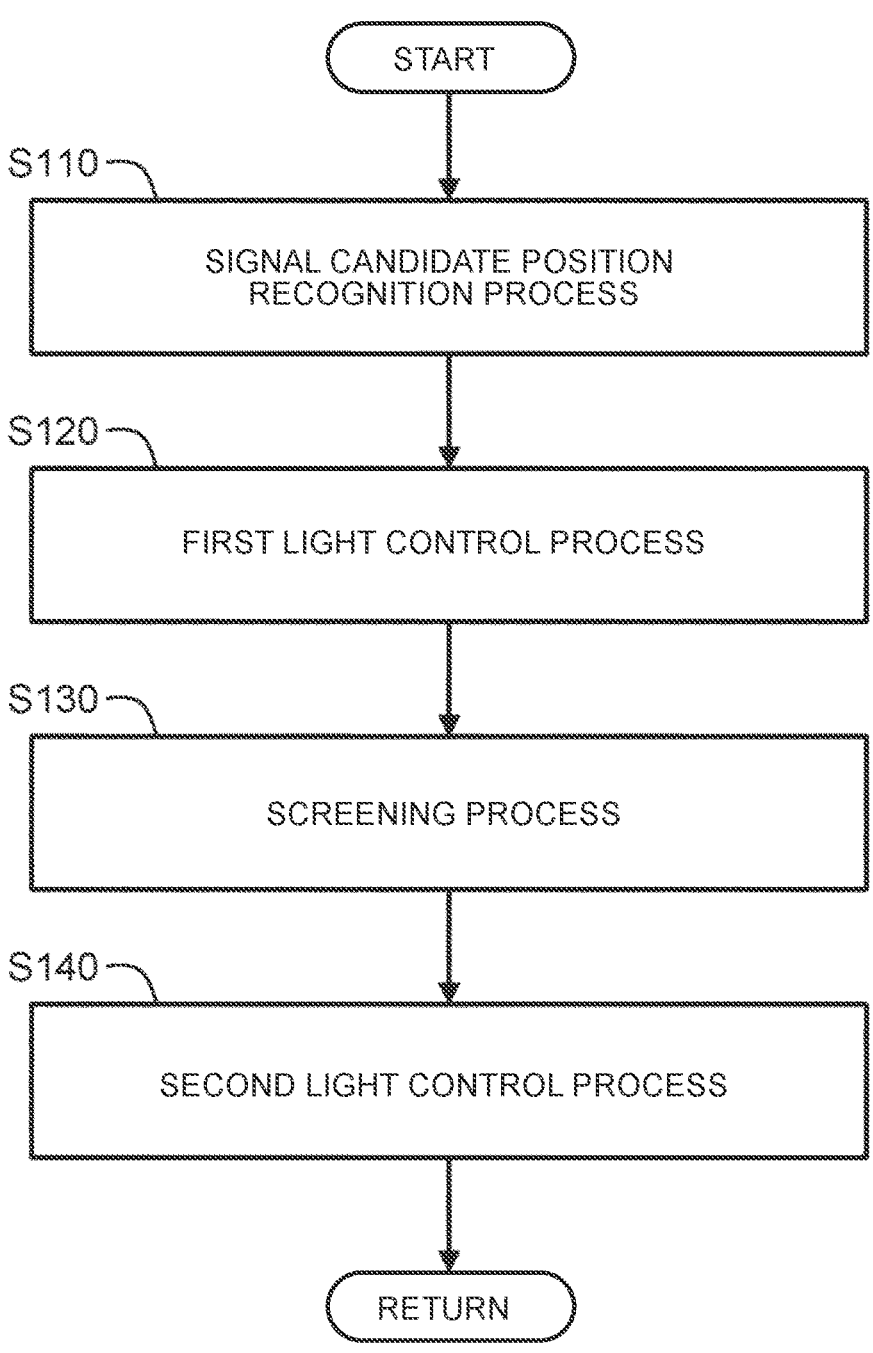
FIG. 15 is a flowchart of a process related to the light control process according to the embodiment.

The control device 100 according to the present embodiment performs the light control process so as to improve the accuracy of traffic light recognition in a dark environment. FIG. 15 is a flowchart of a process related to such a light control process.

5-5-1. Signal Candidate Position Recognition Process (Step S110)

Figure 5:
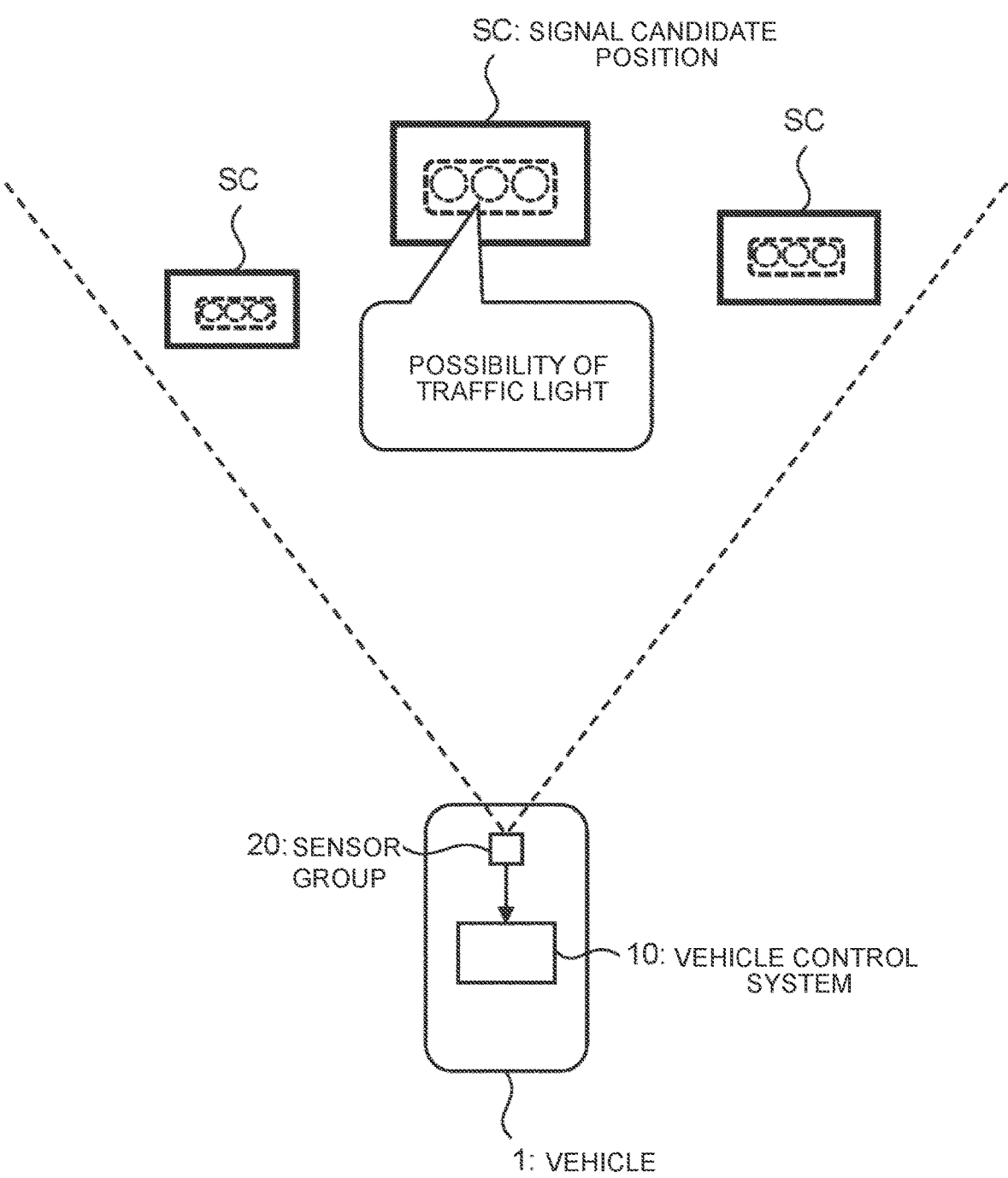
FIG. 5 is a conceptual diagram illustrating a signal candidate position according to the embodiment.

In step S110, the control device 100 recognizes a signal candidate position SC around the vehicle 1 where a traffic light may be present (see FIG. 5). The sensor group 20 is used for this recognition of a signal candidate position SC. Various examples of the method for recognizing a signal candidate position SC will be described below. Evidence is not necessarily required that there is a traffic light at the signal candidate position SC.

First Example

The control device 100 acquires the image IMG obtained by the camera C. The control device 100 analyzes the image IMG and tentatively recognizes a traffic light in the image IMG. For example, the image recognition AI obtained by machine learning is used. A set of traffic lights at an intersection may be tentatively recognized. The control device 100 then sets a signal candidate position SC to the position (fixed range) around the tentatively recognized traffic light. The relative position of the signal candidate position SC with respect to the vehicle 1 is calculated based on the image IMG.

Second Example

The control device 100 acquires the image IMG obtained by the camera C. The control device 100 analyzes the image IMG and recognizes a light source of a signal indication color (green, yellow, red) in the image IMG. The control device 100 then sets a signal candidate position SC to the position (fixed range) around the light source of the signal indication color. The relative position of the signal candidate position SC with respect to the vehicle 1 is calculated based on the image IMG.

Third Example

When a traffic light ahead of the vehicle 1 is red, there is a possibility that a preceding vehicle is stopped at the traffic light. Taillights of a stopped preceding vehicle are red. The control device 100 analyzes the image IMG and recognizes red lights of a preceding vehicle in the image IMG. The control device 100 then sets a signal candidate position SC to the position (fixed range) above the recognized red lights. The relative position of the signal candidate position SC with respect to the vehicle 1 is calculated based on the image IMG.

Fourth Example

The possibility that traffic lights are installed at intersections is high. Therefore, the control device 100 analyzes the image IMG and recognizes an intersection in the image IMG. Alternatively, the control device 100 may acquire the position of an intersection around the vehicle 1, based on the vehicle position information 230 obtained by the position sensor 23 and the map information 240. The control device 100 then sets a signal candidate position SC to the position (fixed range) above the intersection. The relative position of the signal candidate position SC with respect to the vehicle 1 is calculated based on the image IMG, or is calculated based on the vehicle position information 230 and the map information 240.

Fifth Example

Traffic lights are sometimes installed on structures such as utility poles and pedestrian bridges. Structures related to such traffic lights are hereinafter referred to as "traffic light-related structures." The control device 100 recognizes a traffic light-related structure around the vehicle 1, based on the recognition result from the recognition sensor 21 (e.g., camera, LIDAR). That is, the control device 100 recognizes a traffic light-related structure based on the surroundings information 210 (image IMG, object information 212). As another example, the map information 240 in which the positions of structures are registered may be prepared. In that case, the control device 100 can acquire the position of a traffic light-related structure around the vehicle 1, based on the vehicle position information 230 obtained by the position sensor 23 and the map information 240. The control device 100 then sets a signal candidate position SC to the position (fixed range) around the traffic light-related structure. The relative position of the signal candidate position SC with respect to the vehicle 1 is calculated based on the object information 212, or is calculated based on the vehicle position information 230 and the map information 240.

5-5-2. First Light Control Process (Step S120)

In step S120 after step S110, the control device 100 performs the "first light control process" of controlling the light 50 based on the signal candidate position SC. The first light control process is as described in Section 2 above, and includes either or both of the "brightening process" and the "dimming process" (see FIGS. 6 to 8). The first light control process may include the "attenuation process" following the brightening process (see FIG. 9).

The relative position of the signal candidate position SC with respect to the vehicle 1 is calculated as described above. The installation position of the light 50 on the vehicle 1, the installation direction of the light 50, and the optical axis direction of each light source included in the light 50 are known information. Therefore, the control device 100 can control the light 50 so that the signal candidate position SC is selectively illuminated.

5-5-3. Screening Process (Step S130)

In step S130 after step S120, the control device 100 performs the "screening process" of narrowing down the signal candidate position(s) SC (see Section 3 above). For example, the control device 100 recognizes a traffic light in the image IMG using the image recognition AI. The accuracy of traffic light recognition has been improved as a result of the first light control process in step S120. Therefore, in this step S130, the control device 100 can recognize a traffic light in the image IMG with relatively high accuracy.

When the control device 100 determines that there is no traffic light at a certain signal candidate position SC or that the possibility that there is a traffic light at a certain signal candidate position SC is less than the threshold, the control device 100 excludes that signal candidate position SC from signal candidate positions SC for the subsequent processes. As another example, when the control device 100 determines that there is no traffic light in at least a part of the range of a certain signal candidate position SC, or that the possibility that there is a traffic light in at least a part of the range of a certain signal candidate position SC is less than the threshold, the control device 100 excludes this part of the range of the signal candidate position SC from the signal candidate position SC. The position excluded from the signal candidate position(s) SC is an excluded position EX (see FIG. 10).

5-5-4. Second Light Control Process (Step S140)

In step S140 after step S130, the control device 100 performs the "second light control process" of controlling the light 50 based on the signal candidate position(s) SC or the excluded position EX. The second light control process is as described in Section 3 above, and includes either or both of the "brightening process" and the "dimming process." The second light control process may include the "attenuation process" following the brightening process.

The second light control process may not be performed.

6. Switching of Irradiation Targets at Intersection

Figure 16:
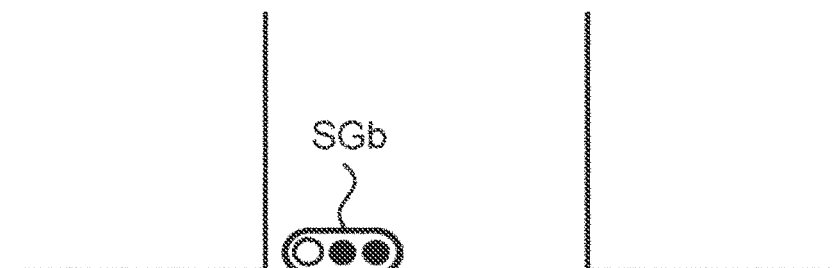
FIG. 16 is a conceptual diagram illustrating switching of irradiation targets according to the embodiment.
Figure 16:
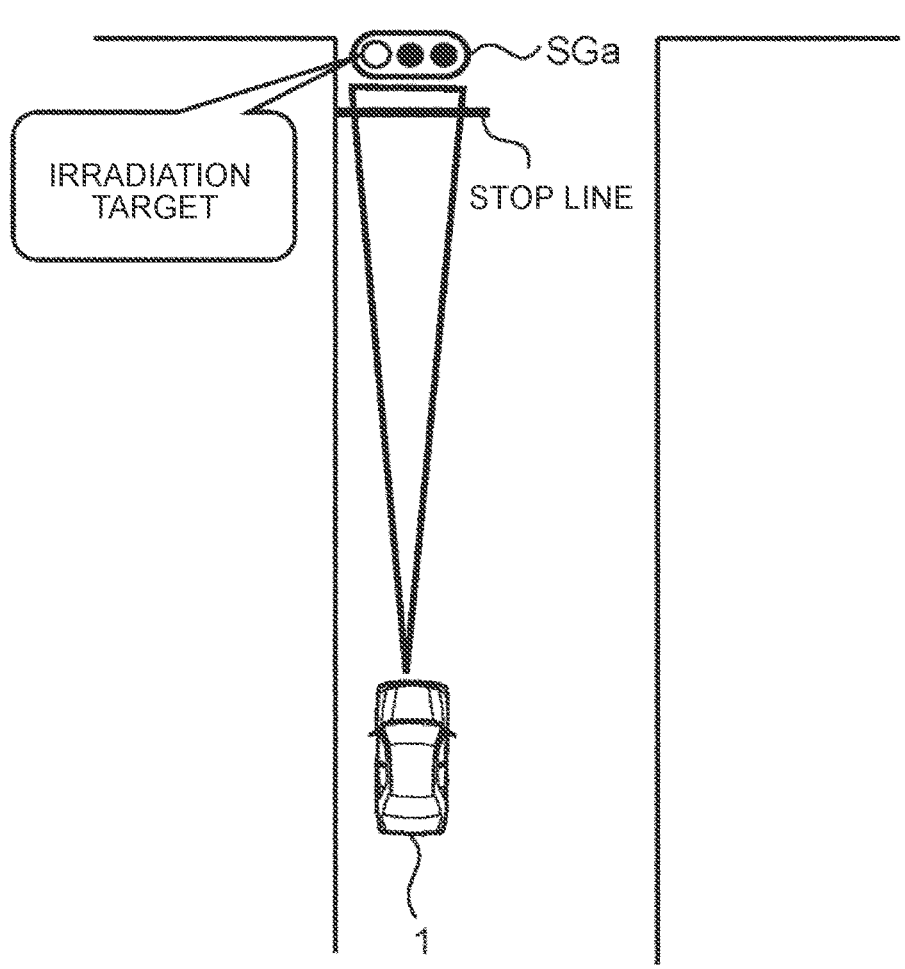
Figure 17:
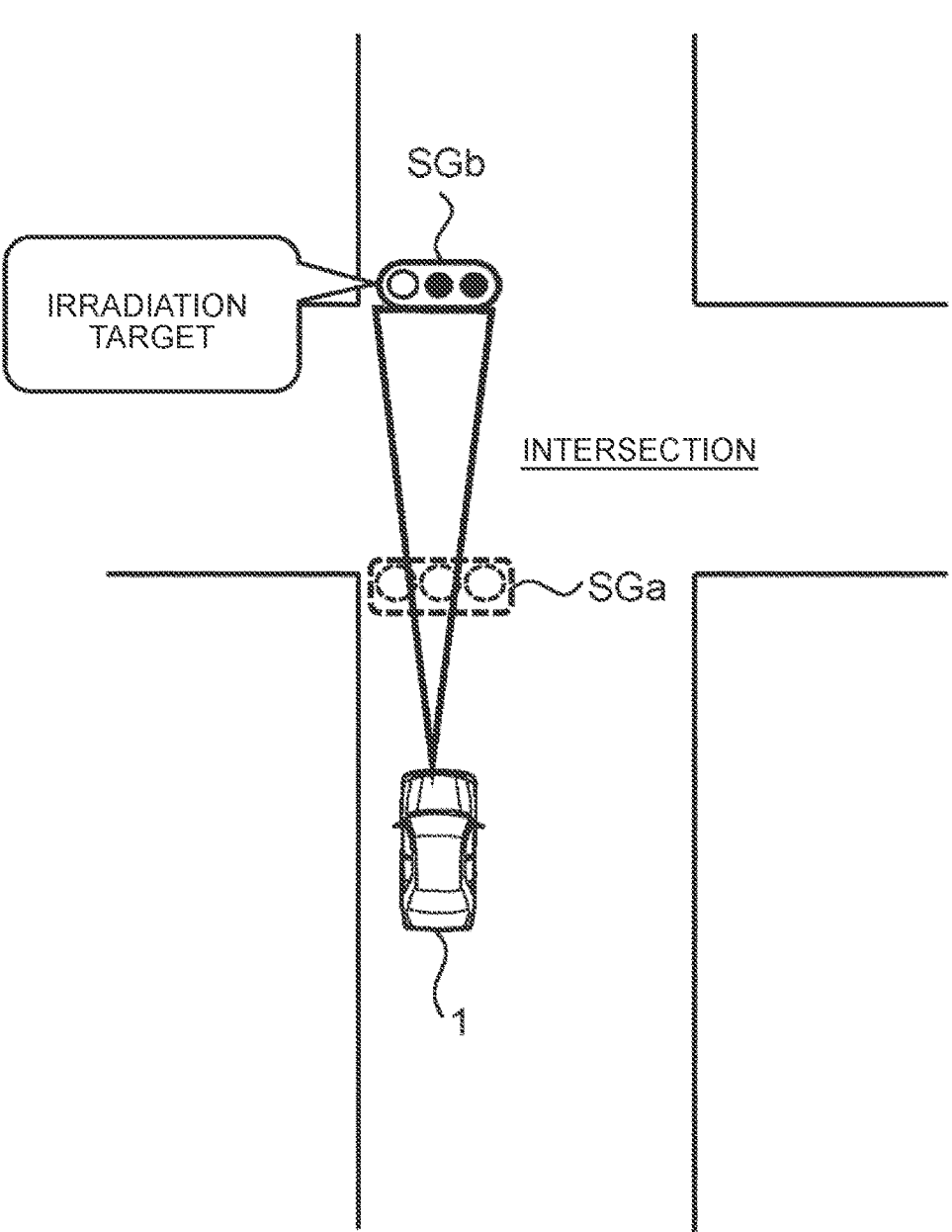
FIG. 17 is a conceptual diagram illustrating switching of irradiation targets according to the embodiment.

FIGS. 16 and 17 are conceptual diagrams illustrating switching of irradiation targets at an intersection. It is herein assumed that a plurality of traffic lights is installed in succession at one intersection ahead of the vehicle 1. The traffic lights include a first traffic light SGa and a second traffic light SGb. The second traffic light SGb is farther away from the vehicle 1 than the first traffic light SGa. That is, the first traffic light SGa is located closer to the vehicle 1 and the second traffic light SGb is located farther away from the vehicle 1, as viewed from the vehicle 1.

The image IMG obtained by the camera C includes both the first traffic light SGa and the second traffic light SGb. The control device 100 recognizes both the first traffic light SGa and the second traffic light SGb based on the image IMG. However, the control device 100 does not set irradiation targets of the light 50 to both the first traffic light SGa and the second traffic light SGb at the same time. The control device 100 switches irradiation targets of the light 50.

More specifically, just being able to recognize the signal indication of the first traffic light SGa is enough when the vehicle 1 is relatively far from the intersection as shown in FIG. 16. There is no need to recognize the signal indication of the second traffic light SGb. Therefore, the control device 100 sets the irradiation target to the first traffic light SGa and excludes the second traffic light SGb from the irradiation target. That is, the control device 100 controls the light 50 so that the first traffic light SGa is illuminated and the second traffic light SGb is not illuminated. This reduces unnecessary reflected light (noise light) from the second traffic light SGb. Power consumption is also reduced.

The irradiation target is then switched from the first traffic light SGa to the second traffic light SGb when the vehicle 1 gets somewhat close to the intersection as shown in FIG. 17. That is, the control device 100 controls the light 50 so that the second traffic light SGb is illuminated and the first traffic light SGa is not illuminated. This reduces unnecessary reflected light (noise light) from the first traffic light SGa. Power consumption is also reduced.

Figure 18:
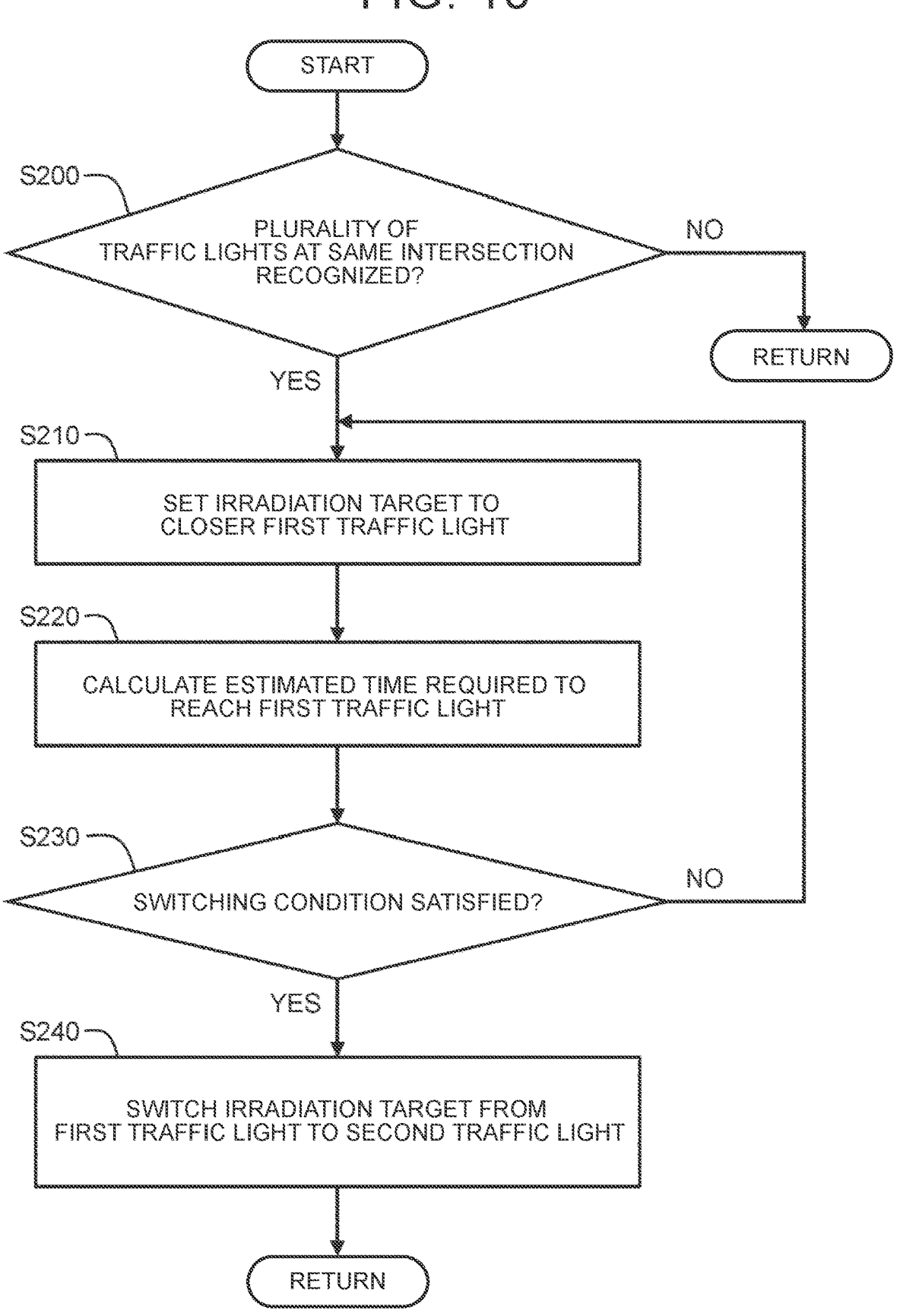
FIG. 18 is a flowchart of a process related to switching of irradiation targets according to the embodiment.

FIG. 18 is a flowchart of a process related to switching of irradiation targets.

In step S200, the control device 100 recognizes a traffic light ahead of the vehicle 1 by using the camera C. When a plurality of traffic lights installed at the same intersection is recognized (step S200; YES), the process proceeds to step S210.

In step S210, the control device 100 sets the irradiation target to the first traffic light SGa closer to the vehicle 1, and excludes the second traffic light SGb farther away from the vehicle 1 from the irradiation target. That is, the control device 100 controls the light 50 so that the first traffic light SGa is illuminated and the second traffic light SGb is not illuminated.

In step S220, the control device 100 estimates the time required for the vehicle 1 to reach the position of the first traffic light SGa. The position of a stop line (see FIG. 16) near the first traffic light SGa may be used instead of the position of the first traffic light SGa. The distance from the vehicle 1 to the first traffic light SGa or the stop line can be obtained from the object information 212. The speed and acceleration of the vehicle 1 are obtained from the vehicle state information 220. Therefore, the control device 100 can calculate the estimated time required for the vehicle 1 to reach the position of the first traffic light SGa, based on the object information 212 and the vehicle state information 220.

In step S230, the control device 100 determines whether a switching condition is satisfied. The switching condition includes at least that "the estimated time is less than a threshold." The switching condition may further include that "the vehicle 1 proceeds straight through the intersection."

Whether the vehicle 1 proceeds straight through the intersection can be determined based on, for example, the target trajectory of the vehicle 1 in autonomous driving control. When the estimated time is equal to or more than the threshold, the switching condition is not satisfied (step S230; NO). In this case, the process returns to step S210. When the switching condition is satisfied (step S230; YES), the process proceeds to step S240.

In step S240, the control device 100 switches the irradiation target from the first traffic light SGa to the second traffic light SGb. That is, the control device 100 controls the light 50 so that the second traffic light SGb is illuminated and the first traffic light SGa is not illuminated.

What is claimed is:

1. A vehicle control method comprising:
recognizing a signal candidate position around a vehicle by using a sensor mounted on the vehicle, the signal candidate position being a position a traffic light is possibly present, the vehicle including a light configured in such a manner that a light distribution state of the light changes;
performing a first light control process of controlling the light in response to recognition of the signal candidate position, the first light control process including at least one of:
increasing an intensity of light emitted to the signal candidate position to a value higher than before the recognition of the signal candidate position; or
making the intensity of the light emitted to the signal candidate position higher than an intensity of light emitted to an area other than the signal candidate position;
acquiring an image of surroundings of the vehicle by using a camera mounted on the vehicle;
performing, after the first light control process, a screening process of narrowing down the signal candidate position based on the image; and
performing a second light control process of controlling the light after the screening process,
wherein an excluded position is a position excluded from the signal candidate position by the screening process; and
wherein the second light control process includes reducing an intensity of light emitted to the excluded position to a value lower than before the screening process.

2. The vehicle control method according to claim 1, wherein the first light control process includes increasing the intensity of the light emitted to the signal candidate position to a value higher than before the recognition of the signal candidate position.

3. The vehicle control method according to claim 2, wherein the first light control process includes selectively illuminating the signal candidate position without illuminating the area other than the signal candidate position.

4. The vehicle control method according to claim 2, wherein the first light control process includes increasing the intensity of the light emitted to the signal candidate position to a value higher than before the recognition of the signal candidate position, and then reducing the intensity of the light emitted to the signal candidate position as the vehicle travels.

5. The vehicle control method according to claim 2, wherein the first light control process further includes reducing the intensity of the light emitted to the area other than the signal candidate position to a value lower than before the recognition of the signal candidate position.

6. The vehicle control method according to claim 1, wherein the second light control process includes increasing the intensity of the light emitted to the signal candidate position to a value even higher than before the screening process.

7. The vehicle control method according to claim 6, wherein the second light control process includes increasing the intensity of the light emitted to the signal candidate position to a value higher than before the screening process, and then reducing the intensity of the light emitted to the signal candidate position as the vehicle travels.

8. The vehicle control method according to claim 1, wherein
the signal candidate position includes
a position at which a traffic light for a first lane in which the vehicle is traveling is possibly present, and
a position at which a traffic light for a second lane crossing the first lane is possibly present.

9. The vehicle control method according to claim 1, wherein
the sensor mounted on the vehicle includes
a recognition sensor configured to recognize surroundings of the vehicle, and
a position sensor configured to acquire a position of the vehicle,
the recognition sensor includes a camera configured to acquire an image of the surroundings of the vehicle,
the recognizing includes at least one of the following:
tentatively recognizing a traffic light in the image and setting the signal candidate position to a position around the tentatively recognized traffic light;
recognizing a light source of a signal indication color in the image and setting the signal candidate position to a position around the light source of the signal indication color;
recognizing a red light of a preceding vehicle in the image and setting the signal candidate position to a position above the red light;
recognizing an intersection in the image or obtaining a position of an intersection around the vehicle based on the position of the vehicle and map information, and setting the signal candidate position to a position above the intersection; and
recognizing a traffic light-related structure around the vehicle by using the recognition sensor or acquiring a position of the traffic light-related structure based on the position of the vehicle and the map information, and setting the signal candidate position to a position around the traffic light-related structure.

10. The vehicle control method according to claim 1, further comprising:
recognizing a plurality of traffic lights installed at one intersection ahead of the vehicle by using a camera mounted on the vehicle, the traffic lights including a first traffic light and a second traffic light that is farther away from the vehicle than the first traffic light;
calculating estimated time required for the vehicle to reach a position of the first traffic light;
setting, when the estimated time is equal to or larger than a threshold, an irradiation target of the light to the first traffic light and excluding the second traffic light from the irradiation target; and
switching the irradiation target from the first traffic light to the second traffic light when a switching condition is satisfied, the switching condition including that the estimated time is less than the threshold.

11. A vehicle control system comprising:

one or more processors configured to perform:

a process of recognizing a signal candidate position around a vehicle by using a sensor mounted on the vehicle, the signal candidate position being a position at which a traffic light is possibly present, the vehicle including a light configured in such a manner that a light distribution state of the light changes; and a first light control process of controlling the light in response to recognition of the signal candidate position, the first light control process including at least one of:

increasing an intensity of light emitted to the signal candidate position to a value higher than before the recognition of the signal candidate position; or making the intensity of the light emitted to the signal candidate position higher than an intensity of light emitted to an area other than the signal candidate position;

acquiring an image of surroundings of the vehicle by using a camera mounted on the vehicle;

performing, after the first light control process, a screening process of narrowing down the signal candidate position based on the image; and performing a second light control process of controlling the light after the screening process, wherein an excluded position is a position excluded from the signal candidate position by the screening process; and wherein the second light control process includes reducing an intensity of light emitted to the excluded position to a value lower than before the screening process.

12. A non-transitory storage medium storing instructions that are executable by one or more processors and that cause the one or more processors to perform functions comprising:

recognizing a signal candidate position around a vehicle by using a sensor mounted on the vehicle, the signal candidate position being a position at which a traffic light is possibly present, the vehicle including a light configured in such a manner that a light distribution state of the light changes; and performing a first light control process of controlling the light in response to recognition of the signal candidate position, the first light control process including at least one of:

increasing an intensity of light emitted to the signal candidate position to a value higher than before the recognition of the signal candidate position; or making the intensity of the light emitted to the signal candidate position higher than an intensity of light emitted to an area other than the signal candidate position;

acquiring an image of surroundings of the vehicle by using a camera mounted on the vehicle;

performing, after the first light control process, a screening process of narrowing down the signal candidate position based on the image; and performing a second light control process of controlling the light after the screening process, wherein an excluded position is a position excluded from the signal candidate position by the screening process; and wherein the second light control process includes reducing an intensity of light emitted to the excluded position to a value lower than before the screening process.

* * * * *